United States Patent
Li et al.

(10) Patent No.: US 12,160,748 B2
(45) Date of Patent: Dec. 3, 2024

(54) DATA TRANSMISSION METHOD AND COMMUNICATIONS APPARATUS

(71) Applicant: HUAWEI TECHNOLOGIES CO., LTD., Guangdong (CN)

(72) Inventors: Bingzhao Li, Beijing (CN); Xuelong Wang, Shenzhen (CN); Lei Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 17/383,882

(22) Filed: Jul. 23, 2021

(65) Prior Publication Data
US 2021/0352486 A1 Nov. 11, 2021

Related U.S. Application Data

(63) Continuation of application No. PCT/CN2020/071632, filed on Jan. 13, 2020.

(30) Foreign Application Priority Data

Jan. 24, 2019 (CN) .......................... 201910070165.9

(51) Int. Cl.
*H04W 12/71* (2021.01)
*H04W 12/033* (2021.01)

(52) U.S. Cl.
CPC ......... *H04W 12/71* (2021.01); *H04W 12/033* (2021.01)

(58) Field of Classification Search
CPC . H04W 12/033; H04W 76/27; H04W 12/037; H04W 12/03; H04W 12/71; H04L 67/01
(Continued)

(56) References Cited

U.S. PATENT DOCUMENTS

2012/0263045 A1 10/2012 Fauconnier et al.
2014/0177448 A1* 6/2014 Wu ........................ H04W 28/18
370/329

(Continued)

FOREIGN PATENT DOCUMENTS

CN 107113655 A 8/2017
CN 107734569 A 2/2018
(Continued)

OTHER PUBLICATIONS

Office Action in Chinese Appln. No. 201910070165.9, dated Apr. 27, 2023, 12 pages.
(Continued)

*Primary Examiner* — Lizbeth Torres-Diaz
(74) *Attorney, Agent, or Firm* — Fish & Richardson P.C.

(57) ABSTRACT

A data transmission method and a communications apparatus are provided. One data transmission example method includes that a core network user plane device receives a first data packet sent by an access network device, where the first data packet includes uplink data of a terminal device and identification information of the terminal device. The core network user plane device obtains context information of the terminal device based on the identification information of the terminal device. The core network user plane device processes the uplink data based on the context information of the terminal device.

12 Claims, 11 Drawing Sheets

(58) Field of Classification Search
USPC .............................. 726/2; 370/237, 329, 331
See application file for complete search history.

(56) References Cited

U.S. PATENT DOCUMENTS

| | | | |
|---|---|---|---|
| 2016/0142951 A1* | 5/2016 | Balasubramanian | .........................  H04W 36/0033 370/331 |
| 2017/0202051 A1* | 7/2017 | Hwang | ................. H04W 76/19 |
| 2017/0279522 A1* | 9/2017 | Yi | ..................... H04W 74/0833 |
| 2018/0343692 A1* | 11/2018 | Lee | ........................ H04W 92/18 |
| 2019/0037493 A1* | 1/2019 | Richards | ........... H04W 52/0209 |
| 2019/0373462 A1* | 12/2019 | Xu | ...................... H04W 12/037 |
| 2020/0068477 A1* | 2/2020 | Awada | .................. H04W 48/12 |
| 2020/0154331 A1* | 5/2020 | Yang | .................... H04W 12/033 |
| 2020/0322095 A1* | 10/2020 | Park | ....................... H04L 1/1893 |
| 2021/0105622 A1* | 4/2021 | Rajadurai | ............... H04W 8/26 |
| 2021/0321478 A1* | 10/2021 | Jung | ...................... H04W 76/11 |
| 2022/0007458 A1* | 1/2022 | Lin | .................. H04W 72/0446 |
| 2023/0144979 A1* | 5/2023 | Niu | ....................... H04L 5/0005 370/329 |

FOREIGN PATENT DOCUMENTS

| | | |
|---|---|---|
| CN | 108260171 A | 7/2018 |
| CN | 108366369 A | 8/2018 |
| CN | 108632815 A | 10/2018 |
| CN | 108882334 A | 11/2018 |
| CN | 108924826 A | 11/2018 |
| WO | 2018194971 A1 | 10/2018 |

OTHER PUBLICATIONS

Office Action issued in Chinese Application No. 201910070165.9 on May 6, 2022, 12 pages.

3GPP TR 23.724, V16.0.0 (Dec. 2018), "3rd Generation Partnership Project; Technical Specification Group Services and System Aspects; Study on Cellular Internet of Things (IoT) support and evolution for the 5G System (Release 16)," Dec. 2018, 276 pages.

3GPP TS 36.300 V15.4.0 (Dec. 2018), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), " Dec. 2018, 363 pages.

3GPP TS 36.331, V15.4.0 (Dec. 2018), "3rd Generation Partnership Project; Technical Specification Group Radio Access Network; Evolved Universal Terrestrial Radio Access (E-UTRA); Radio Resource Control (RRC); Protocol specification (Release 15)," Dec. 2018, 933 pages.

3GPP TS 23.401, V16.1.0 (Dec. 2018), "3rd Generation Partnership Project; Technical Specification Group Services and System Aspects; General Packet Radio Service (GPRS) enhancements for Evolved Universal Terrestrial Radio Access Network (E-UTRAN) access (Release 16)," Dec. 2018, 411 pages.

Extended European Search Report issued in European Application No. 20745731.8 on Feb. 21, 2022, 11 pages.

Huawei, HiSilicon, "TS23.502: PDU session activation in CM-CONNECTED state," SA WG2 Meeting #119, Dubrovnik, Croatia, Feb. 13-17, 2017, S2-170985, 7 pages.

PCT International Search Report and Written Opinion issued in International Application No. PCT/CN2020/071632 on Apr. 15, 2020, 17 pages (with English translation).

* cited by examiner

DATA TRANSMISSION METHOD AND COMMUNICATIONS APPARATUS

CROSS-REFERENCE TO RELATED APPLICATIONS

This application is a continuation of International Application No. PCT/CN2020/071632, filed on Jan. 13, 2020, which claims priority to Chinese Patent Application No. 201910070165.9, filed on Jan. 24, 2019. The disclosures of the aforementioned applications are hereby incorporated by reference in their entireties.

TECHNICAL FIELD

This application relates to the field of communications technologies, and more specifically, to a data transmission method and a communications apparatus.

BACKGROUND

In the $3^{rd}$ generation partnership project ($3^{rd}$ generation partnership project, 3GPP), to perform data transmission, a terminal device needs to first establish a radio resource control (radio resource control, RRC) connection to an access network device, for example, an evolved NodeB (evolved node B, eNB), and then the access network device establishes a non-access stratum (non-access stratum, NAS) connection to a mobility management entity (mobility management entity, MME), so that the terminal device may send data to the eNB on a bearer established between the terminal device and the eNB, and the eNB may further send the data to a serving gateway (serving gateway, SGW) on a bearer between the eNB and the SGW, to complete the data transmission.

When the terminal device has neither a data transmission service nor a voice service in a period of time, the terminal device may switch to an idle state to save air interface resources and save power of the terminal device. Correspondingly, bearers related to the access network device are also temporarily deleted. For example, in this case, the bearer between the SGW and the eNB and the bearer between the eNB and the terminal device are deleted. When needing to transmit a data packet, the terminal device needs to re-establish a radio resource control connection. Tens of instructions are required to establish the connection. This increases overheads of data packet transmission and reduces transmission efficiency.

In a current technology, to resolve the foregoing problem, the access network device retains context information between the terminal device and the eNB and context information between the eNB and the MME when the terminal device switches to the idle state. When needing to transmit data, the terminal device may initiate a connection resume request to the eNB, and simultaneously transmit the data. Because the context information between the terminal device and the eNB and the context information between the eNB and the MME are retained, the connection may be resumed based on the retained context information.

In the foregoing solution, a large amount of context information is stored in the access network device. In addition, to quickly resume the connection, each terminal device needs to reserve a dedicated data tunnel, and therefore, a large amount of dedicated tunnel information needs to be stored between the access network device and a core network device. Consequently, an information storage amount is increased and information redundancy is caused, affecting data transmission efficiency.

SUMMARY

This application provides a data transmission method and a communications apparatus, to improve data transmission efficiency.

According to a first aspect, a data transmission method is provided. The method provided in the first aspect may be performed by a core network user plane device, or may be performed by a chip disposed in a core network user plane device. This is not limited in this application.

Specifically, the method includes: The core network user plane device receives a first data packet sent by an access network device, where the first data packet includes uplink data of a terminal device and identification information of the terminal device. The core network user plane device obtains context information of the terminal device based on the identification information of the terminal device. The core network user plane device processes the uplink data based on the context information of the terminal device.

In the data transmission method provided in the first aspect, when data is to be transmitted, the core network user plane device obtains the context information of the terminal device based on the identification information of the terminal device that is included in the data packet, and processes the uplink data of the terminal device based on the context information. The core network user plane device needs to retain only the context information of the terminal device. This reduces overheads of small-packet data transmission, and improves data transmission efficiency.

In a possible implementation of the first aspect, the core network user plane device receives the context information of the terminal device from a core network control plane device.

The context information of the terminal device is stored in the core network user plane device. When the terminal device performs data transmission, to-be-transmitted data is directly transmitted to the core network user plane device through a common data tunnel between the access network device and the core network user plane device.

In a possible implementation of the first aspect, the context information of the terminal device includes security context information of the terminal device and/or compression context information of the terminal device. That the core network user plane device processes the uplink data based on the context information of the terminal device includes: The core network user plane device decrypts the uplink data based on the security context information of the terminal device; and/or the core network user plane device decompresses the uplink data based on the compression context information of the terminal device.

After determining the context information of the terminal device based on the identification information of the terminal device that is included in the received first data packet, the core network user plane device processes the data in the first data packet based on a specific type of the context information.

In a possible implementation of the first aspect, the core network user plane device determines a first data tunnel corresponding to the terminal device, where the first data tunnel is a data tunnel in at least one common data tunnel.

In a possible implementation of the first aspect, the first data tunnel is allocated by the core network control plane device, or is a TMSI of the terminal device.

In a possible implementation of the first aspect, the core network user plane device sends identification information of the first data tunnel to the core network control plane device.

In a possible implementation of the first aspect, that the core network user plane device receives a first data packet sent by an access network device includes: The core network user plane device receives, on the first data tunnel, the first data packet sent by the access network device.

In a possible implementation of the first aspect, the at least one common data tunnel is located between the core network user plane device and the access network device.

In a possible implementation of the first aspect, the core network user plane device receives a third data packet of the terminal device, where the third data packet includes downlink data of the terminal device and a destination address of the third data packet. The core network user plane device determines the identification information of the terminal device based on the destination address of the third data packet. The core network user plane device obtains the context information of the terminal device based on the identification information of the terminal device.

The core network user plane device stores a correspondence between the destination address of the third data packet and the identification information of the terminal device. After receiving the third data packet of the terminal device, the core network user plane device determines the identification information of the terminal device based on the destination address carried in the third data packet and the correspondence between the destination address of the third data packet and the identification information of the terminal device, then may uniquely determine the context information of the terminal device based on the identification information of the terminal device, and further processes the downlink data included in the third data packet of the terminal device.

In a possible implementation of the first aspect, the context information of the terminal device includes the security context information of the terminal device and/or the compression context information of the terminal device. That the core network user plane device processes the downlink data based on the context information of the terminal device includes: The core network user plane device encrypts the downlink data based on the security context information of the terminal device; and/or the core network user plane device compresses the downlink data based on the compression context information of the terminal device.

In a possible implementation of the first aspect, the core network user plane device sends a fourth data packet to the access network device, where the fourth data packet includes the processed downlink data.

In a possible implementation of the first aspect, the fourth data packet further includes at least one of the following information: cell information of the terminal device, the identification information of the terminal device or a cell C-RNTI of the terminal device, a TA list of the terminal device, and an interval between a current moment and a moment of the last data transmission of the terminal device.

According to a second aspect, a data transmission method is provided. The method provided in the second aspect may be performed by an access network device, or may be performed by a chip disposed in an access network device. This is not limited in this application.

Specifically, the method includes: The access network device receives an uplink data packet sent by a terminal device, where the uplink data packet includes uplink data of the terminal device and identification information of the terminal device. The access network device sends a first data packet to a core network user plane device, where the first data packet includes the uplink data of the terminal device and the identification information of the terminal device.

In a possible implementation of the second aspect, that the access network device sends a first data packet to a core network user plane device includes: The access network device sends the first data packet to the core network user plane device on a first data tunnel, where the first data tunnel is a data tunnel in at least one common data tunnel, and the at least one common data tunnel is located between the core network user plane device and the access network device.

In a possible implementation of the second aspect, the access network device sends first control information to the terminal device, where the first control information includes the identification information of the terminal device.

In a possible implementation of the second aspect, the first control information further includes an RRC configuration index of the terminal device and/or identification information of the first data tunnel corresponding to the terminal device.

Because a terminal device in a communications system performs data transmission on a common data tunnel, common information may be configured for the terminal device in the communications system by using RRC, and an RRC configuration information table may be established. The RRC configuration index corresponds to one group of RRC configuration information. The configuration information table may be searched for the corresponding RRC configuration information based on the RRC configuration index, and subsequent data transmission is performed based on the RRC configuration information. This greatly reduces an information storage amount and reduces overheads.

In a possible implementation of the second aspect, the access network device determines an RRC configuration of the terminal based on the RRC configuration index, and processes the uplink data packet based on the RRC configuration to generate the first data packet. Alternatively, the access network device selects the first data tunnel based on the identification information of the first data tunnel, and sends the first data packet to the core network user plane device on the first tunnel.

Optionally, when the uplink data packet includes the RRC configuration index of the terminal device, the access network device determines, based on the RRC configuration index, the RRC configuration information corresponding to the terminal device, for example, PDCP or RLC configuration information, and processes the uplink data packet based on the RRC configuration information corresponding to the terminal device to generate the first data packet. For example, if the RLC configuration information is summarized and included in the RRC configuration information, the access network device removes an RLC header of the uplink data packet, uses RLC payload information as the first data packet, and performs an RLC-related status report operation. Alternatively, for example, if the RLC configuration information and the PDCP configuration information are summarized and included in the RRC configuration information, the access network device removes RLC and PDCP headers of the uplink data packet, and uses PDCP payload information as the first data packet.

In a possible implementation of the second aspect, the first control information further includes information about a valid area of the terminal device.

In a possible implementation of the second aspect, the access network device receives second control information sent by a core network control plane device, where the second control information includes the identification information of the first data tunnel that is in the at least one common data tunnel and that corresponds to the terminal device.

In a possible implementation of the second aspect, the access network device receives a fourth data packet sent by the core network user plane device, where the fourth data packet includes downlink data of the terminal device that is processed by the core network user plane device. The access network device sends, to the terminal device, the downlink data of the terminal device that is processed by the core network user plane device.

In a possible implementation of the second aspect, the fourth data packet further includes at least one of the following information: cell information of the terminal device, the identification information of the terminal device or a C-RNTI of the terminal device, a TA list of the terminal device, and an interval between a current moment and a moment of the last data transmission of the terminal device.

In a possible implementation of the second aspect, that the access network device sends, to the terminal device, the downlink data of the terminal device that is processed by the core network user plane device includes: When the C-RNTI of the terminal device is valid, the access network device sends, to the terminal device by using the C-RNTI, the downlink data of the terminal device that is processed by the core network user plane device and that is included in the fourth data packet; or when the C-RNTI of the terminal device is invalid, the access network device sends, to the terminal device through paging, the downlink data of the terminal device that is processed by the core network user plane device and that is included in the fourth data packet.

Optionally, after determining the terminal device based on the identification information of the terminal device or the C-RNTI of the terminal device in first information, the access network device determines whether the C-RNTI of the terminal device is still valid. If the C-RNTI of the terminal device is still valid, the access network device schedules the terminal device by using the C-RNTI of the terminal device, and sends, to the terminal device, the downlink data of the terminal device that is processed by the core network user plane device and that is included in the fourth data packet.

Optionally, if the C-RNTI of the terminal device is invalid, the access network device sends a paging message to the terminal device, where the paging message includes the identification information of the terminal device and preamble information of the terminal device, and the preamble information includes a list of a preamble and information about a corresponding beam. After receiving the paging message, the terminal device determines a downlink beam used by the terminal device, determines a to-be-used preamble based on a preamble corresponding to the downlink beam, and sends the determined to-be-used preamble to the access network device. The access network device sends, to the terminal device based on the preamble of the terminal device, the downlink data of the terminal device that is processed by the core network user plane device and that is included in the fourth data packet.

According to a third aspect, a data transmission method is provided. The method provided in the third aspect may be performed by an access network device, or may be performed by a chip disposed in an access network device. This is not limited in this application.

Specifically, the method includes: The access network device receives a first data packet sent by a terminal device, where the first data packet includes uplink data of the terminal device and identification information of the terminal device. The access network device obtains context information of the terminal device based on the identification information of the terminal device. The access network device processes the uplink data based on the context information of the terminal device.

In a possible implementation of the third aspect, the access network device receives the context information of the terminal device from a core network control plane device.

In a possible implementation of the third aspect, the context information of the terminal device includes security context information of the terminal device and/or compression context information of the terminal device. That the access network device processes the uplink data based on the context information of the terminal device includes: The access network device decrypts the uplink data based on the security context information of the terminal device; and/or the access network device decompresses the uplink data based on the compression context information of the terminal device.

In a possible implementation of the third aspect, the access network device sends first control information to the terminal device, where the first control information includes the identification information of the terminal device.

Optionally, the identification information of the terminal device may be allocated by the access network device, or may be allocated by the core network control plane device, or may be a TMSI of the terminal device.

Optionally, when the identification information of the terminal device is the TMSI of the terminal device, the first control information may not include the identification information of the terminal device.

In a possible implementation of the third aspect, the first control information further includes a radio resource control RRC configuration index of the terminal device and/or identification information of a first data tunnel corresponding to the terminal device, where the first data tunnel is a data tunnel in at least one common data tunnel.

In a possible implementation of the third aspect, the at least one common data tunnel is located between a core network user plane device and the access network device.

In a possible implementation of the third aspect, the first control information further includes information about a valid area of the terminal device.

In a possible implementation of the third aspect, the method further includes: The access network device receives second control information sent by the core network control plane device, where the second control information includes the identification information of the first data tunnel that is in the at least one common data tunnel and that corresponds to the terminal device.

In a possible implementation of the third aspect, the method further includes: The access network device sends a second data packet to the core network user plane device, where the second data packet includes the processed uplink data.

In a possible implementation of the third aspect, that the access network device sends a second data packet to the core network user plane device includes: The access network device sends the second data packet to the core network user plane device on the first data tunnel corresponding to the terminal device.

In a possible implementation of the third aspect, the first data packet further includes the tunnel identification information, and the method further includes: The access network device determines the first data tunnel based on the tunnel identification information.

In a possible implementation of the third aspect, the first data packet further includes the RRC configuration index, and the method further includes: The access network device determines, based on the RRC configuration index, RRC configuration information used by the terminal device, and processes the uplink data based on the RRC configuration information.

Optionally, when the first data packet includes the RRC configuration index of the terminal device, the RRC configuration information is first determined based on the RRC configuration index. The access network device processes, based on the RRC configuration information, the uplink data included in the first data packet, and then processes the uplink data in the first data packet based on the context information of the terminal device.

For example, if RLC configuration information is summarized and included in the RRC configuration information, the access network device removes an RLC header of the first data packet, uses RLC payload information as the first data packet, and performs an RLC-related status report operation. Alternatively, for example, if RLC configuration information and PDCP configuration information are summarized and included in the RRC configuration information, the access network device removes RLC and PDCP headers of the first data packet, and uses PDCP payload information as the first data packet.

In a possible implementation of the third aspect, the method further includes: The access network device receives a third data packet of the terminal device that is sent by the core network user plane device, where the third data packet includes downlink data of the terminal device and the identification information of the terminal device. The access network device obtains the context information of the terminal device based on the identification information of the terminal device. The access network device processes the downlink data based on the context information of the terminal device.

In a possible implementation of the third aspect, the context information of the terminal device includes the security context information of the terminal device and/or the compression context information of the terminal device. That the access network device processes the downlink data based on the context information of the terminal device includes: The access network device encrypts the downlink data based on the security context information of the terminal device; and/or the access network device compresses the downlink data based on the compression context information of the terminal device.

In a possible implementation of the third aspect, the method includes: The access network device sends a fourth data packet to the terminal device, where the fourth data packet includes the processed downlink data.

In a possible implementation of the third aspect, that the access network device sends a fourth data packet to the terminal device includes: When a C-RNTI of the terminal device is valid, the access network device sends the fourth data packet to the terminal device by using the C-RNTI; or when a C-RNTI of the terminal device is invalid, the access network device sends the fourth data packet to the terminal device through paging.

Optionally, the access network device first determines whether the C-RNTI of the terminal device is still valid. If the C-RNTI of the terminal device is still valid, the access network device schedules the terminal device by using the C-RNTI of the terminal device.

Optionally, if the C-RNTI of the terminal device is invalid, the access network device sends a paging message to the terminal device, where the paging message includes the identification information of the terminal device and preamble information of the terminal device, and the preamble information includes a list of a preamble and information about a corresponding beam. After receiving the paging message, the terminal device determines a downlink beam used by the terminal device, determines a to-be-used preamble based on a preamble corresponding to the downlink beam, and sends the determined to-be-used preamble to the access network device. The access network device sends the fourth data packet to the terminal device based on the preamble of the terminal device.

According to a fourth aspect, a data transmission method is provided. The method provided in the fourth aspect may be performed by a terminal device, or may be performed by a chip disposed in a terminal device. This is not limited in this application.

Specifically, the method includes: The terminal device obtains identification information of the terminal device. The terminal device sends a first data packet to an access network device, where the first data packet includes uplink data of the terminal device and the identification information of the terminal device.

In a possible implementation of the fourth aspect, the method further includes: The terminal device receives first control information sent by the access network device, where the first control information includes the identification information of the terminal device.

Optionally, the identification information of the terminal device may be allocated by the access network device, or may be allocated by a core network control plane device, or may be a TMSI of the terminal device, provided that the terminal device can be effectively distinguished. This is not limited in this application.

In a possible implementation of the fourth aspect, the first control information further includes an RRC configuration index of the terminal device and/or identification information of a first data tunnel corresponding to the terminal device, where the first data tunnel is a data tunnel in at least one common data tunnel.

In a possible implementation of the fourth aspect, the first data packet includes the RRC configuration index of the terminal device and/or the identification information of the first data tunnel corresponding to the terminal device.

Because a terminal device in a communications system performs data transmission on a common data tunnel, common information may be configured for the terminal device in the communications system by using RRC, and an RRC configuration information table may be established. The RRC configuration index corresponds to one group of RRC configuration information. The configuration information table may be searched for the corresponding RRC configuration information based on the RRC configuration index, and subsequent data transmission is performed based on the RRC configuration information. This greatly reduces an information storage amount and reduces overheads.

In a possible implementation of the fourth aspect, when there is only one common data tunnel, the first control information may not include the identification information of the first data tunnel corresponding to the terminal device.

In a possible implementation of the fourth aspect, the at least one common data tunnel is located between a core network user plane device and the access network device.

In a possible implementation of the fourth aspect, the first control information further includes information about a valid area of the terminal device, and the method further includes:

The terminal device determines, based on the information about the valid area, whether the first data packet is capable of being sent.

According to a fifth aspect, a data transmission method is provided. The method provided in the fifth aspect may be performed by a network device, or may be performed by a chip disposed in a network device. This is not limited in this application.

Specifically, the method includes: The network device receives a first data packet sent by an access network device, where the first data packet includes uplink data of a terminal device and identification information of the terminal device. The network device obtains context information of the terminal device based on the identification information of the terminal device. The network device processes the uplink data based on the context information of the terminal device.

In a possible implementation of the fifth aspect, that the network device obtains context information of the terminal device based on the identification information of the terminal device includes: The network device receives the context information of the terminal device that is sent by a core network control plane device.

In a possible implementation of the fifth aspect, the context information of the terminal device includes security context information of the terminal device and/or compression context information of the terminal device. That the network device processes the uplink data based on the context information of the terminal device includes: The network device decrypts the uplink data based on the security context information of the terminal device; and/or the network device decompresses the uplink data based on the compression context information of the terminal device.

In a possible implementation of the fifth aspect, the method further includes: The network device determines a first data tunnel corresponding to the terminal device, where the first data tunnel is a tunnel in at least one common data tunnel, each data tunnel in the at least one common data tunnel includes a first partial data tunnel and a second partial data tunnel, the first partial data tunnel is a data tunnel between the access network device and the network device, and the second partial data tunnel is a tunnel between the network device and a core network user plane device.

In a possible implementation of the fifth aspect, the method further includes: The network device sends identification information of the first data tunnel to the core network control plane device.

In a possible implementation of the fifth aspect, that the network device receives a first data packet sent by an access network device includes: The network device receives, on the first partial data tunnel of the first data tunnel, the first data packet sent by the access network device.

In a possible implementation of the fifth aspect, the method further includes: The network device sends a second data packet to the core network user plane device, where the second data packet includes the processed uplink data.

In a possible implementation of the fifth aspect, that the network device sends a second data packet to the core network user plane device includes: The network device sends the second data packet to the core network user plane device on the second partial data tunnel of the first data tunnel corresponding to the terminal device.

In a possible implementation of the fifth aspect, the method further includes: The network device receives a third data packet of the terminal device that is sent by the core network user plane device, where the third data packet includes downlink data of the terminal device and the identification information of the terminal device. The network device obtains the context information of the terminal device based on the identification information of the terminal device. The network device processes the downlink data based on the context information of the terminal device.

In a possible implementation of the fifth aspect, that the network device processes the downlink data based on the context information of the terminal device includes: The network device encrypts the downlink data based on the security context information of the terminal device; and/or the network device compresses the downlink data based on the compression context information of the terminal device.

In a possible implementation of the fifth aspect, the method includes: The network device sends a fourth data packet of the terminal device to the access network device, where the fourth data packet includes the processed downlink data.

In a possible implementation of the fifth aspect, the fourth data packet further includes at least one of the following information: cell information of the terminal device, the identification information of the terminal device or a C-RNTI of the terminal device, a TA list of the terminal device, and an interval between a current moment and a moment of the last data transmission of the terminal device.

According to a sixth aspect, a data transmission method is provided. The method provided in the sixth aspect may be performed by an access network device, or may be performed by a chip disposed in an access network device. This is not limited in this application.

Specifically, the method includes: The access network device receives an uplink data packet sent by a terminal device, where the uplink data packet includes uplink data of the terminal device and identification information of the terminal device. The access network device sends a first data packet to a network device, where the first data packet includes the uplink data of the terminal device and the identification information of the terminal device.

In a possible implementation of the sixth aspect, that the access network device sends a first data packet to a network device includes: The access network device sends the first data packet to the network device on a first partial data tunnel of a first data tunnel, where the first data tunnel is a data tunnel in at least one common data tunnel, each data tunnel in the at least one common data tunnel includes the first partial data tunnel and a second partial data tunnel, the first partial data tunnel is a data tunnel between the access network device and the network device, and the second partial data tunnel is a tunnel between the network device and a core network user plane device.

In a possible implementation of the sixth aspect, the method further includes: The access network device sends first control information to the terminal device, where the first control information includes the identification information of the terminal device.

In a possible implementation of the sixth aspect, the first control information further includes an RRC configuration index of the terminal device and/or identification information of the first data tunnel corresponding to the terminal device, and the first data packet further includes the RRC configuration index and/or the identification information of the first data tunnel.

In a possible implementation of the sixth aspect, the uplink data packet further includes the RRC configuration index and/or the identification information of the first data tunnel.

Because a terminal device in a communications system performs data transmission on a common data tunnel, common information may be configured for the terminal device in the communications system by using RRC, and an RRC configuration information table may be established. The RRC configuration index corresponds to one group of RRC configuration information. The configuration information table may be searched for the corresponding RRC configuration information based on the RRC configuration index, and data processing is performed based on the RRC configuration information. This greatly reduces an information storage amount and reduces overheads.

In a possible implementation of the sixth aspect, the method further includes: The access network device determines an RRC configuration of the terminal device based on the RRC configuration index, and processes the uplink data packet based on the RRC configuration to generate the first data packet; or the access network device selects the first data tunnel based on the identification information of the first data tunnel, and sends the first data packet to the core network user plane device on the first tunnel.

In a possible implementation of the sixth aspect, if RLC configuration information is summarized and included in the RRC configuration information, the access network device removes an RLC header of the uplink data packet, uses RLC payload information as the first data packet, and performs an RLC-related status report operation. Alternatively, for example, if RLC configuration information and PDCP configuration information are summarized and included in the RRC configuration information, the access network device removes RLC and PDCP headers of the uplink data packet, and uses PDCP payload information as the first data packet.

In a possible implementation of the sixth aspect, the first control information further includes information about a valid area of the terminal device.

In a possible implementation of the sixth aspect, the method further includes: The access network device receives second control information sent by a core network control plane device, where the second control information includes the identification information of the first data tunnel that is in the at least one common data tunnel and that corresponds to the terminal device.

In a possible implementation of the sixth aspect, the method further includes: The access network device receives a fourth data packet sent by the network device, where the fourth data packet includes downlink data of the terminal device that is processed by the network device.

In a possible implementation of the sixth aspect, the fourth data packet further includes at least one of the following information: cell information of the terminal device, the identification information of the terminal device or a C-RNTI of the terminal device, a TA list of the terminal device, and an interval between a current moment and a moment of the last data transmission of the terminal device.

In a possible implementation of the sixth aspect, that the access network device sends the fourth data packet to the terminal device includes: When the C-RNTI of the terminal device is valid, the access network device sends, to the terminal device by using the C-RNTI, the downlink data of the terminal device that is processed by the network device and that is included in the fourth data packet; or when the C-RNTI of the terminal device is invalid, the access network device sends, to the terminal device through paging, the downlink data of the terminal device that is processed by the network device and that is included in the fourth data packet.

In a possible implementation of the sixth aspect, after determining the terminal device based on the identification information of the terminal device or the C-RNTI of the terminal device in the first information, the access network device determines whether the C-RNTI of the terminal device is still valid. If the C-RNTI of the terminal device is still valid, the access network device schedules the terminal device by using the C-RNTI of the terminal device, and sends, to the terminal device, the downlink data of the terminal device that is processed by the network device and that is included in the fourth data packet.

In a possible implementation of the sixth aspect, if the C-RNTI of the terminal device is invalid, the access network device sends a paging message to the terminal device, where the paging message includes the identification information of the terminal device and preamble information of the terminal device, and the preamble information includes a list of a preamble and information about a corresponding beam. After receiving the paging message, the terminal device determines a downlink beam used by the terminal device, determines a to-be-used preamble based on a preamble corresponding to the downlink beam, and sends the determined to-be-used preamble to the access network device. The access network device sends, to the terminal device based on the preamble of the terminal device, the downlink data of the terminal device that is processed by the network device and that is included in the fourth data packet.

According to a seventh aspect, a communications apparatus is provided. The communications apparatus may be configured to perform an operation of the core network user plane device according to any one of the first aspect or the possible implementations of the first aspect. Specifically, the communications apparatus includes corresponding means (means) configured to perform the steps or functions described in the first aspect. The steps or functions may be implemented by using software, hardware, or a combination of hardware and software.

According to an eighth aspect, a communications apparatus is provided. The communications apparatus may be configured to perform an operation of the access network device according to any one of the second aspect or the possible implementations of the second aspect, or configured to perform an operation of the access network device according to any one of the third aspect or the possible implementations of the third aspect, or configured to perform an operation of the access network device according to any one of the sixth aspect or the possible implementations of the sixth aspect. Specifically, the communications apparatus includes corresponding means (means) configured to perform the steps or functions described in the second aspect, the third aspect, or the sixth aspect. The steps or functions may be implemented by using software, hardware, or a combination of hardware and software.

According to a ninth aspect, a communications apparatus is provided. The communications apparatus may be configured to perform an operation of the terminal device according to any one of the fourth aspect or the possible implementations of the fourth aspect. Specifically, the communications apparatus includes corresponding means (means) configured to perform the steps or functions described in the fourth aspect. The steps or functions may be implemented by using software, hardware, or a combination of hardware and software.

According to a tenth aspect, a communications apparatus is provided. The communications apparatus may be configured to perform an operation of the network device according to any one of the fifth aspect or the possible implementations of the fifth aspect. Specifically, the communications apparatus includes corresponding means (means) configured to perform the steps or functions described in the fifth aspect. The steps or functions may be implemented by using software, hardware, or a combination of hardware and software.

According to an eleventh aspect, a computer program product is provided. The computer program product includes a computer program (which may also be referred to as code or instructions). When the computer program is run, a computer is enabled to perform the data transmission method according to any one of the first aspect to the sixth aspect or the possible implementations of the first aspect to the sixth aspect.

According to a twelfth aspect, a computer-readable storage medium is provided. The computer-readable storage medium stores a program, and the program enables a server in a computer to perform any data transmission method according to any one of the first aspect to the sixth aspect or the possible implementations of the first aspect to the sixth aspect.

Alternatively, the computer-readable storage medium is configured to store computer software instructions used by the foregoing server, and the computer software instructions include a program designed for performing any data transmission method according to any possible implementation of the first aspect to the sixth aspect.

According to a thirteenth aspect, a chip system is provided. The chip system includes a processor, configured to support a server in a computer in implementing the function according to any one of the first aspect to the sixth aspect or the implementations of the first aspect to the sixth aspect.

DESCRIPTION OF EMBODIMENTS

The following describes technical solutions of this application with reference to the accompanying drawings.

It should be understood that, as classified based on access standards, the technical solutions in the embodiments of this application may be applied to various communications systems, for example, a global system for mobile communications (global system of mobile communication, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a wireless cellular network system, a 5G system, and a future communications system.

Figure 1:
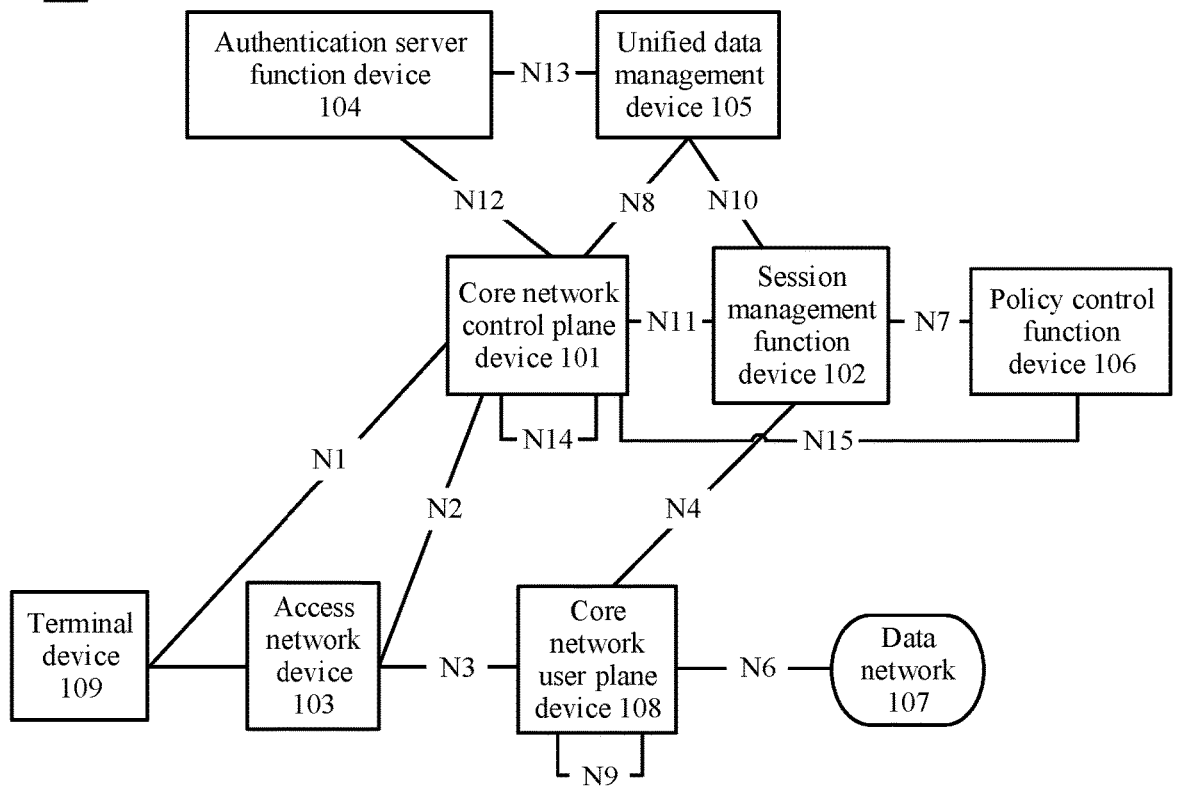
FIG. 1 is a schematic diagram of a communications system using a data transmission method according to this application.

FIG. 1 is a schematic diagram of a communications system 100 using a wireless communication method according to this application. As shown in FIG. 1, the communications system 100 mainly includes an AMF 101, a session management function device (session management function, SMF) 102, a radio access network device (radio access network, RAN) 103, an authentication server function device (authentication server function, AUSF) 104, a unified data management device (unified data management, UDM) 105, a policy control function device (policy control function, PCF) 106, a data network (data network, DN) 107, a user plane function device (user plane function, UPF) 108, and a terminal device 109. The terminal device 109 is connected to the AMF 101 through an N1 interface, and the UE 109 is connected to the RAN 103 by using a radio resource control (radio resource control, RRC) protocol. The RAN 103 is connected to the AMF 101 through an N2 interface, and the RAN 103 is connected to the UPF 108 through an N3 interface. A plurality of UPFs 108 are connected through an N9 interface, the UPF 108 is connected to the DN 107 through an N6 interface, and the UPF 108 is connected to the SMF 102 through an N4 interface. The SMF 102 is connected to the PCF 106 through an N7 interface, the SMF 102 is connected to the UDM 105 through an N10 interface, and the SMF 102 is connected to the AMF 101 through an N11 interface. A plurality of AMFs 101 are connected through an N14 interface, the AMF 101 is connected to the UDM 105 through an N8 interface, the AMF 101 is connected to the AUSF 104 through an N12 interface, and the AMF 101 is connected to the PCF 106 through an N15 interface. The AUSF 104 is connected to the UDM 105 through an N13 interface. The AMF 101 and the SMF 102 obtain user subscription data from the UDM 105 respectively through the N8 interface and the N10 interface, and obtain policy data from the PCF 106 respectively through the N15 interface and the N7 interface. The SMF 102 controls the UPF 108 through the N4 interface.

The terminal device 109 may also be referred to as user equipment (user equipment, UE), a terminal (terminal), a mobile station (mobile station, MS), a mobile terminal (mobile terminal), or the like. The terminal device may communicate with one or more core networks through the radio access network (radio access network, RAN). The terminal device may also be referred to as an access terminal, a subscriber unit, a subscriber station, a mobile station, a mobile station, a remote station, a remote terminal, a mobile device, a user terminal, a terminal, a wireless communications device, a user agent, or a user apparatus. The terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network, and the like.

The radio access network RAN 103 may include a device, for example, a base station or a base station controller, that communicates with the terminal device 109. It should be understood that the RAN 103 may communicate with any quantity of terminal devices that are similar to the terminal device 109. Each RAN may provide communication coverage for a specific geographical area, and may communicate with a terminal device located in the coverage area (cell). The RAN 103 may support communications protocols of different standards, or may support different communication modes. Optionally, the RAN 103 may be an evolved NodeB (evolved node B, eNodeB), a wireless fidelity access point (wireless fidelity access point, Wi-Fi AP), a worldwide interoperability for microwave access base station (worldwide interoperability for microwave access base station, WiMAX BS), a radio controller in a cloud radio access network (cloud radio access network, CRAN), an access network device in a 5G network, an access network device in a future evolved public land mobile network (public land mobile network, PLMN), or the like.

Optionally, one AMF 101 may simultaneously serve a plurality of terminal devices 109.

Optionally, one SMF 102 may simultaneously serve a plurality of terminal devices 109.

Optionally, the AMF 101 may reselect a serving AMF for the terminal device 109.

It should be understood that when the terminal device 109 enters an idle state, an RRC connection and an N2 interface that are for the terminal device 109 may be released.

Aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to various media that can store, contain, and/or carry instructions and/or data.

In the embodiments of this application, to reduce signaling overheads of small-packet data transmission, a network device is configured to store a security context of a terminal device that is to perform data transmission, and maintain a common data tunnel that is of the terminal device and that is between an access network device and a core network user plane device. Specifically, the network device is responsible for pre-establishing a network-side common data tunnel to aggregate small-packet data, and is responsible for data identification to encrypt/decrypt data based on context information.

Figure 2:
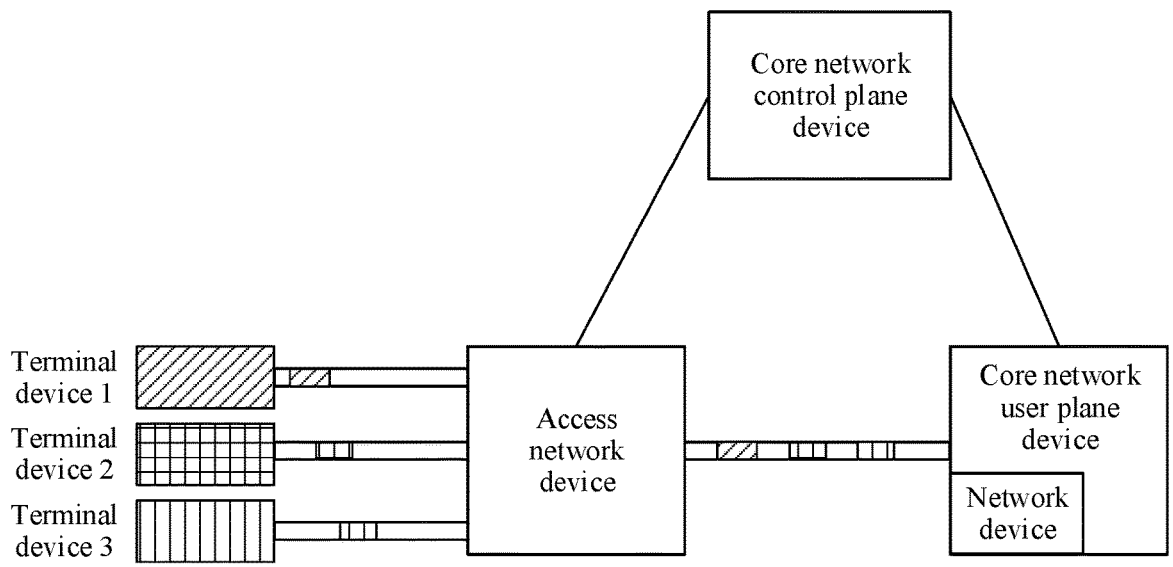
FIG. 2 is a schematic architectural diagram of an application scenario according to an embodiment of this application.

FIG. 2 is a schematic architectural diagram of an application scenario according to an embodiment of this application. In this embodiment of this application, functions of a network device are integrated into a core network user plane device. As shown in FIG. 2, a terminal device 1, a terminal device 2, and a terminal device 3 are separately connected to an access network device. The access network device receives data of the terminal device 1, the terminal device 2, and the terminal device 3, and transmits the data to the core network user plane device on a common data tunnel between the access network device and the core network user plane device. Because the data is transmitted on the common data tunnel, a first data packet includes the data and identification information of the terminal device during data transmission, and the first data packet is sent to the core network user plane device. Before data transmission, a core network control plane device sends stored context information of the terminal device to the core network user plane device. After receiving the first data packet, the core network user plane device obtains the context information of the terminal device based on the identification information of the terminal device in the first data packet, and processes the data in the first data packet of the terminal device based on the context information of the terminal device, to complete the data transmission.

Figure 3:
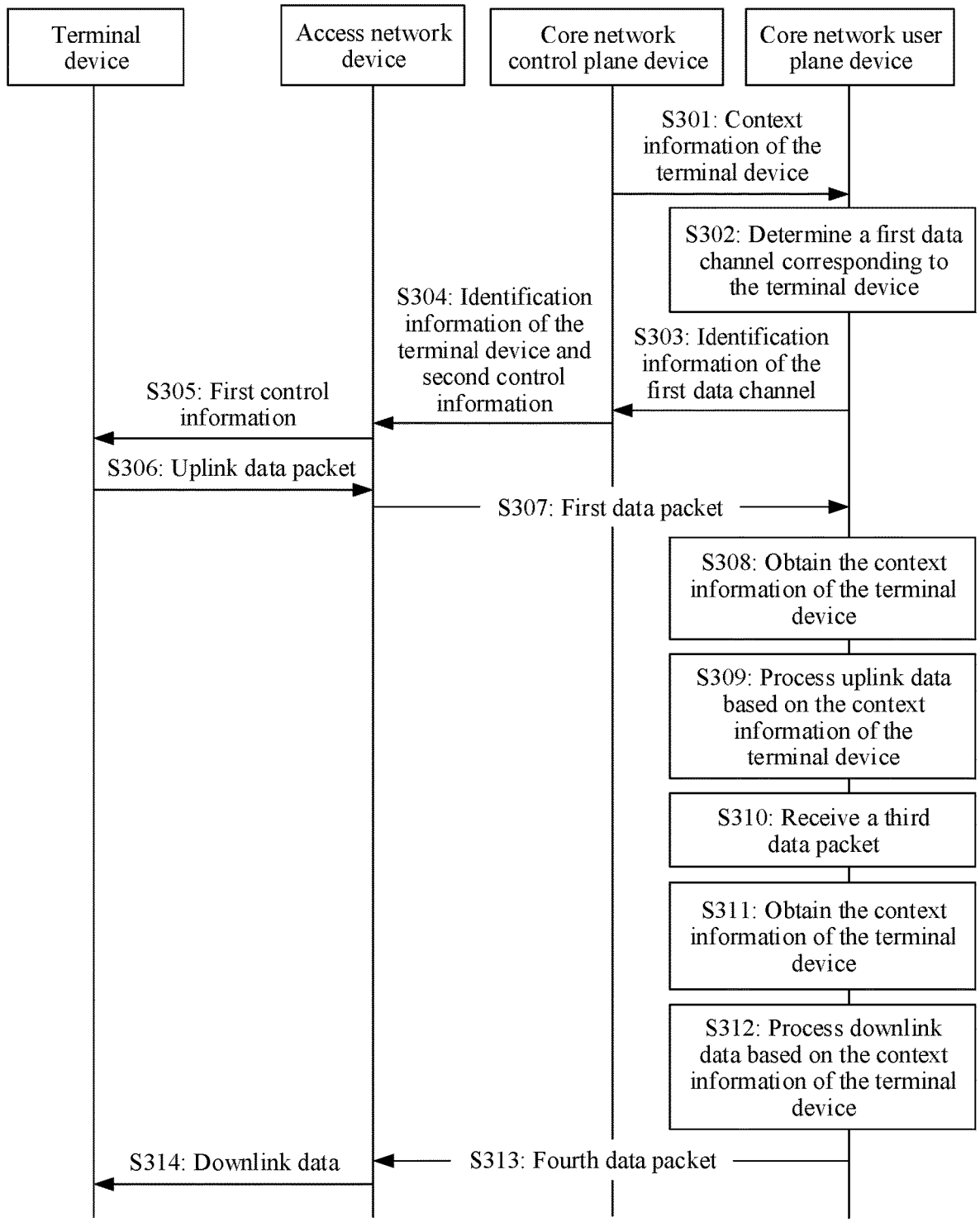
FIG. 3 is a schematic flowchart of a data transmission method according to an embodiment of this application.

FIG. 3 is a schematic flowchart of a data transmission method 300 according to an embodiment of this application. The method 300 may be applied to the architecture shown in FIG. 2. The method 300 includes steps S301 to S314, where steps S301 to S306 and S310 to S314 are optional steps. The following describes the steps in detail.

S301: A core network control plane device sends context information of a terminal device to a core network user plane device.

When the terminal device enters an idle state, to reduce overheads of small-packet data transmission, context information of all terminal devices in a communications system may be stored in the core network control plane device. The context information of each terminal device is in a one-to-one correspondence with the terminal device, and is uniquely identified by identification information of the terminal device.

Before the terminal device performs data transmission, the core network control plane device sends the stored context information of the terminal device to the core network user plane device, and the core network user plane device stores the context information of the terminal device. In a data transmission process, an access network device may directly transmit data to the core network user plane device, and the core network user plane device processes the data based on the stored context information.

Optionally, the context information of the terminal device may be sent by the core network control plane device to the core network user plane device before the data transmission. Alternatively, the context information of the terminal device may be sent together with to-be-transmitted data during the data transmission. Alternatively, the core network control plane device may send the context information of the terminal device to the core network user plane device when receiving a terminal device context request sent by the core network user plane device. This is not limited in this embodiment of this application.

S302: The core network user plane device determines a first data tunnel corresponding to the terminal device.

Optionally, at least one common data tunnel is established between the access network device and the core network user plane device to perform data transmission. Establishment of the common data tunnel may be completed before access of the terminal device. In addition, a plurality of access network devices may establish the common data tunnel with the core network user plane device, so that the terminal device may use the common data tunnel when moving within coverage of the plurality of access network devices. If a quantity of common data tunnels between each of the plurality of access network devices and the core network user plane device is the same, and identification information of the common data tunnel is the same, when a same terminal device moves from one access network device to another access network device, the terminal device may use a correct common data tunnel.

Before the data transmission, the core network user plane device determines, for the terminal device, the first data tunnel used for the data transmission.

S303: The core network user plane device sends identification information of the determined first data tunnel to the core network control plane device.

It should be noted that the identification information of the first data tunnel may uniquely identify the first data tunnel. For example, the identification information of the first data tunnel may be address information of the data tunnel, or may be identification information of the data tunnel, provided that the first data tunnel can be effectively distinguished. This is not limited in this application.

Optionally, when the terminal devices in the communications system share one data tunnel, in other words, there is only one common data tunnel established between the core network user plane device and the access network device, steps S302 and S303 may not be performed.

In some alternative implementations, the first data tunnel corresponding to the terminal device may be determined by the core network control plane device. In this case, step S302 may be: The core network control plane device determines the first data tunnel corresponding to the terminal device. Correspondingly, step S303 is: The core network control plane device sends the identification information of the determined first data tunnel to the core network user plane device.

S304: The core network control plane device sends the identification information of the terminal device and second control information to the access network device.

The identification information of the terminal device is in a one-to-one correspondence with the terminal device, and the identification information of the terminal device may uniquely identify the terminal device.

Optionally, the second control information includes the identification information of the first data tunnel used by the terminal device, for example, the address information of the first data tunnel or flag information of the first data tunnel.

Optionally, the second control information may further include information about a valid area of the terminal device.

S305: The access network device sends first control information to the terminal device.

Optionally, the first control information may include the identification information of the terminal device.

Optionally, the identification information of the terminal device may be allocated by the core network control plane device, or may be allocated by the core network user plane device, or may be a temporary mobile subscriber identity (temporary mobile subscriber identity, TMSI) of the terminal device, provided that the terminal device can be effectively distinguished. This is not limited in this application.

It should be understood that when the identification information of the terminal device is the TMSI of the terminal device, the first control information may not include the identification information of the terminal device.

Optionally, the terminal device receives the first control information sent by the access network device, where the first control information further includes an RRC configuration index of the terminal device and/or the identification information of the first data tunnel corresponding to the terminal device. The terminal device determines RRC configuration information corresponding to the RRC configuration index. The RRC configuration information may be predefined, or may be obtained from the access network device. In addition, the RRC configuration information and the RRC configuration index may be simultaneously obtained from the access network device, or may be separately obtained from the access network device by using different messages.

When the terminal device communicates with the access network device, common information may be configured for the terminal devices in the communications system by using RRC, and an RRC configuration information table may be established. The RRC configuration index corresponds to one group of RRC configuration information. The configuration information table may be searched for the corresponding RRC configuration information based on the RRC configuration index, and subsequent data transmission is performed based on the RRC configuration information. In this manner, the access network device may maintain a specific quantity of pieces of common RRC configuration information to serve a large quantity of terminal devices, and does not need to store dedicated RRC configuration information for each terminal device. This greatly reduces an information storage amount, and reduces RRC configuration storage overheads. In addition, when configuring the RRC configuration index for the terminal device, the access network device may further configure, for the terminal device, the RRC configuration information corresponding to the RRC configuration index. Alternatively, the RRC configuration index and the RRC configuration information corresponding to the RRC configuration index are configured for the terminal device by using different messages or in different manners. This is not limited in this embodiment of this application.

Optionally, to ensure that different access network devices can determine the unique RRC configuration information based on the RRC configuration index when the terminal device moves between the different access network devices, the different access network devices need to synchronously store a correspondence between the RRC configuration information and the RRC configuration index.

For example, a network operation and maintenance device may configure, for the different access network devices, the same RRC configuration information and the RRC configuration index corresponding to the RRC configuration information. Alternatively, the access network device obtains, from the core network control plane device, the RRC configuration information and the RRC configuration index corresponding to the RRC configuration information, so that different access network devices obtain the same configuration information. Alternatively, any one of the plurality of access network devices sends, to another access network device, the stored RRC configuration information and the RRC configuration index corresponding to the RRC configuration information, so that the another access network device obtains the same RRC configuration information and the same corresponding RRC configuration index as the access network device.

Optionally, the RRC configuration information includes one or more logical channels, and packet data convergence protocol (packet data convergence protocol, PDCP) and/or radio link control (radio link control, RLC) configuration information corresponding to each logical channel. A logical channel and PDCP and/or RLC configuration information that correspond to the RRC configuration index may be sent to the terminal device together with the configuration index, or may be a configuration defined in a protocol. This is not limited in this application.

For example, Table 1 lists RRC configuration information corresponding to one RRC configuration index.

TABLE 1

| | RRC configuration information | | |
|---|---|---|---|
| | Logical channel parameter | PDCP parameter (optional) | RLC parameter |
| Logical channel 1 | Logical channel ID = 1 Logical channel priority = 1 . . . | SN length: 12 bits Reassembly timer: with infinite duration . . . | SN length: 12 bits Maximum retransmission threshold: 8 . . . |
| Logical channel 2 | Logical channel ID = 2 Logical channel priority = 2 . . . | SN length: 12 bits Reassembly timer: with infinite duration . . . | SN length: 12 bits Maximum retransmission threshold: 16 . . . |
| Logical channel 3 | Logical channel ID = 3 Logical channel priority = 3 . . . | SN length: 12 bits Reassembly timer: with infinite duration . . . | SN length: 12 bits Maximum retransmission threshold: 8 . . . |
| . . . | | | |

Table 1 lists three logical channels, namely, the logical channel 1, the logical channel 2, and the logical channel 3. The RRC configuration information includes the logical channel parameter and the RLC parameter, and may further include the PDCP parameter. The logical channel parameter includes logical channel ID information, logical channel priority information, and the like. Different logical channels correspond to different logical channel IDs and different logical channel priorities. For example, a sequence of the three logical channels listed in Table 1 is the logical channel 1, the logical channel 2, and the logical channel 3 in descending order of the logical channel priorities. The PDCP parameter includes SN length information, duration of the reassembly timer, and the like. The SN lengths in the PDCP parameters corresponding to different logical channels are the same, for example, are 12 bits. The duration of the reassembly timer is infinite. Correspondingly, the SN lengths in the RLC parameters are also the same, for example, are 12 bits. Different logical channels correspond to different maximum retransmission thresholds. For example, the maximum retransmission threshold corresponding to the logical channel 1 is 8, the maximum retransmission threshold corresponding to the logical channel 2 is 16, and the maximum retransmission threshold corresponding to the logical channel 3 is 8.

Optionally, the access network device may configure a specific quantity of pieces of RRC configuration information based on communication quality requirements of different services. For example, 256 sets of RRC configuration information are configured, and each set of RRC configuration information is used for one type of service. For a plurality of terminal devices, the access network device may select one or more sets of RRC configuration information from the 256 sets of RRC configuration information, and configure the selected sets of RRC configuration information for different terminal devices. A quantity of pieces of to-be-used RRC configuration information is related to a length of the RRC configuration index. For example, an 8-bit RRC configuration index is required to use the 256 sets of RRC configuration information.

It should be understood that Table 1 merely lists the RRC configuration information corresponding to one RRC configuration index as an example. This is not limited in this embodiment of this application.

It should be understood that when there is only one common data tunnel, the first control information may not include the identification information of the first data tunnel corresponding to the terminal device.

Optionally, the first control information further includes the information about the valid area of the terminal device, and the valid area may include a group of cells. The valid area may be determined by the access network device, or may be determined based on a valid area sent by the core network control plane device. These cells in the valid area may belong to a same base station or different base stations. When performing data output in the valid area, the terminal device may use information sent in the first control information. Otherwise, the information cannot be used for data transmission. A network device ensures that the access network devices have the same correspondence between the RRC configuration index and the RRC configuration information in the valid area. If there are a plurality of common data tunnels, it is ensured that the access network device and the core network user plane device have a same common data tunnel configuration in the valid area, to ensure that when moving in the valid area, the terminal device can use the RRC configuration information and the common data tunnels to perform data transmission.

To reduce overheads of data transmission, when no data needs to be transmitted, dedicated configuration information and dedicated data tunnel information of the terminal device do not need to be stored. When needing to perform data transmission, the terminal device performs the data transmission on the at least one common data tunnel established between the access network device and the core network user plane device, and no dedicated data tunnel needs to be established. Step S301 to step S305 are performed to complete preparation of the data transmission, and an uplink data packet including the identification information of the terminal device and uplink data that needs to be transmitted is formed.

S306: The terminal device sends the uplink data packet to an access network device.

It should be noted that, whether the access network device to which the terminal device sends the uplink data packet is the access network device that sends the first control information to the terminal device in step S305 or another access network device depends on a moving status of the terminal device. This is not limited in this embodiment of this application.

Optionally, the terminal device sends the uplink data packet to the access network device based on the first control information, where the uplink data packet includes the RRC configuration index and/or the identification information of the first data tunnel. For example, the uplink data packet is a media access control protocol data unit (media access control protocol data unit, MAC PDU), the RRC configuration index and/or the identification information of the first data tunnel may be used as a media access control control element (media access control control element, MAC CE), and the MAC PDU includes the MAC CE and a data part of the uplink data packet. Alternatively, the RRC configuration index and/or the identification information of the first data tunnel are/is carried on a signaling bearer to be sent, and a MAC PDU includes the signaling bearer and a data part bearer of the uplink data packet.

Optionally, the terminal device checks whether a cell in which the terminal device is currently located belongs to the valid area. If the cell in which the terminal device is currently located belongs to the valid area, the terminal device sends the uplink data packet to the access network device based on a configuration of the first control information. If the cell in which the terminal device is currently located does not belong to the valid area, the uplink data packet cannot be directly sent, and the terminal device needs to first initiate a connection establishment request, and then send the uplink data packet after a connection is established.

Figure 4:
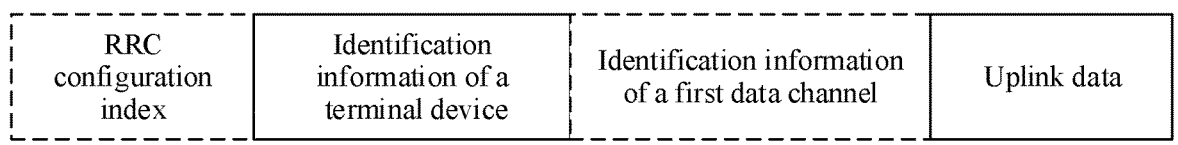
FIG. 4 is a format diagram of a first data packet according to an embodiment of this application.

For example, a format of the uplink data packet is shown in FIG. 4. As shown in FIG. 4, the uplink data packet includes the to-be-transmitted uplink data and the identification information of the terminal device. When the first control information includes the RRC configuration index or the identification information of the first data tunnel, the uplink data packet further includes the RRC configuration index of the terminal device and the identification information of the first data tunnel that corresponds to the terminal device and that is used for data transmission.

Optionally, when the first control information does not include the RRC configuration index or the identification information of the first data tunnel, the uplink data packet includes only the identification information of the terminal device and the uplink data.

Optionally, before sending the uplink data packet to the access network device, the terminal device sends a preamble to the access network device, and the access network device allocates a grant and a radio network temporary identifier (cell radio network temporary identifier, C-RNTI) of the terminal device to the terminal device based on the preamble. The terminal device sends the uplink data packet to the access network device based on the allocated grant.

Because preamble information is not unique, when a plurality of terminal devices simultaneously send a preamble to the access network device, the access network device allocates a grant and a C-RNTI to the corresponding terminal devices based on the preamble. For example, when preambles sent by a terminal device #1 and a terminal device #2 to the access network device are the same, the access network device allocates a grant to the terminal device #1 and the terminal device #2. In this case, the terminal device #1 and the terminal device #2 perform data transmission on a same resource. This causes contention, and only one terminal device successfully performs data transmission at most. To determine whether a terminal device successfully performs data transmission, the access network device sends contention resolution information. If the terminal device #1 receives the contention resolution information, the terminal device #1 successfully performs data transmission. Similarly, when the terminal device #2 receives the contention resolution information, the terminal device #2 successfully performs data transmission. Alternatively, if neither the terminal device #1 nor the terminal device #2 receives the contention resolution information, neither the terminal device #1 nor the terminal device #2 successfully performs data transmission.

Optionally, when the terminal device sends the uplink data packet, a first timer is started, and the C-RNTI of the terminal device is monitored until the first timer expires.

Optionally, when the cell in which the terminal device is currently located does not belong to the valid area, the terminal device initiates an RRC connection establishment request to the access network device, to request to establish an RRC connection to transmit the uplink data.

Optionally, a MAC control element carrying the RRC configuration index and the identification information of the terminal device may be sent.

S307: The access network device sends a first data packet to the core network user plane device.

Optionally, when the uplink data packet includes the RRC configuration index of the terminal device, the access network device determines, based on the RRC configuration index, the RRC configuration information corresponding to the terminal device, for example, the PDCP or RLC configuration information, and processes the uplink data packet based on the RRC configuration information corresponding to the terminal device to generate the first data packet. Because different access network devices have synchronized the correspondence between the RRC configuration information and the RRC configuration index, the access network device herein may determine the RRC configuration information based on the RRC configuration index even if the access network device is not the access network device that sends the first control information to the terminal device. For example, if the RLC configuration information is summarized and included in the RRC configuration information, the access network device removes an RLC header of the uplink data packet, uses RLC payload information as the first data packet, and performs an RLC-related status report operation. Alternatively, for example, if the RLC configuration information and the PDCP configuration information are summarized and included in the RRC configuration information, the access network device removes RLC and PDCP headers of the uplink data packet, and uses PDCP payload information as the first data packet.

Optionally, when the uplink data packet includes the identification information of the first data tunnel corresponding to the terminal device, the access network device sends the first data packet to the core network user plane device on the first data tunnel.

Alternatively, the access network device selects the first data tunnel based on the identification information of the first data tunnel, where the first data tunnel is used to send the first data packet to the core network user plane device. Because different access network devices have established the common data tunnel with the core network user plane device, even if the access network device herein is not the access network device that sends the first control information to the terminal device, the access network device may select, by using the identification information of the first data tunnel, the first data tunnel to send the first data packet.

It should be understood that when there is one established common data tunnel, the uplink data packet may not include the identification information of the first data tunnel.

Optionally, when the access network device sends the first data packet to the core network user plane device, the first data packet further includes information about the cell in which the terminal device is currently located and/or the C-RNTI of the terminal device.

S308: The core network user plane device obtains the context information of the terminal device.

After receiving the first data packet sent by the access network device, and before processing the uplink data packet in the first data packet, the core network user plane device first obtains the context information of the terminal device from the stored context information of the plurality of terminal devices based on the identification information of the terminal device in the first data packet. The identification information of the terminal device is used to uniquely determine the context information of the terminal device.

S309: The core network user plane device processes the uplink data based on the context information of the terminal device.

After determining the context information of the terminal device based on the identification information of the terminal device, the core network user plane device processes the uplink data in the first data packet based on the context information of the terminal device.

Optionally, the context information of the terminal device includes security context information of the terminal device and/or compression context information of the terminal device. The core network user plane device decrypts the uplink data of the terminal device based on the security context information of the terminal device, and/or decompresses the uplink data of the terminal device based on the compression context information of the terminal device.

Steps S301 to S309 are a transmission method for the uplink data of the terminal device. In some possible alternative manners, transmission of downlink data of the terminal device is further included. A transmission method for the downlink data of the terminal device is described in detail below with reference to steps S310 to S314.

S310: The core network user plane device receives a third data packet of the terminal device.

The third data packet of the terminal device includes the downlink data of the terminal device and a destination address of the third data packet. Optionally, the destination address of the third data packet is an IP address of the terminal device.

S311: The core network user plane device obtains the context information of the terminal device.

Optionally, the core network user plane device may further store a correspondence between the identification information of the terminal device and the destination address of the third data packet. After receiving the third data packet of the terminal device, and before processing a downlink data packet in the third data packet, the core network user plane device first determines the identification information of the terminal device based on the destination address of the third data packet (for example, the IP address of the terminal device) and the correspondence between the identification information of the terminal device and the destination address of the third data packet, and then obtains the context information of the terminal device from the stored context information of the plurality of terminal devices based on the identification information of the terminal device. The identification information of the terminal device is used to uniquely determine the context information of the terminal device.

S312: The core network user plane device processes the downlink data of the terminal device based on the context information of the terminal device.

For example, the context information of the terminal device includes the security context information of the terminal device and/or the compression context information of the terminal device. The core network user plane device encrypts the downlink data of the terminal device based on the security context information of the terminal device, and/or compresses the downlink data of the terminal device based on the compression context information of the terminal device.

S313: The core network device sends a fourth data packet to the access network device. The fourth data packet includes the processed downlink data of the terminal device.

In addition, the fourth data packet further includes first information.

Optionally, the first information includes the information about the current cell of the terminal device, the identification information of the terminal device or the C-RNTI of the terminal device, a tracking area (tracking area, TA) list, and an interval between a current moment and a moment of the last data transmission of the terminal device.

S314: The access network device sends the downlink data to the terminal device.

After determining the terminal device based on the identification information of the terminal device or the C-RNTI of the terminal device in the first information, the access network device determines whether the C-RNTI of the terminal device is still valid. If the C-RNTI of the terminal device is still valid, the access network device schedules the terminal device by using the C-RNTI of the terminal device, and sends, to the terminal device, the downlink data of the terminal device that is processed by the core network user plane device and that is included in the fourth data packet.

If the C-RNTI of the terminal device is invalid, the access network device sends a paging message to the terminal device, where the paging message includes the identification information of the terminal device and preamble information of the terminal device, and the preamble information includes a list of a preamble and information about a corresponding beam. After receiving the paging message, the terminal device determines a downlink beam used by the terminal device, determines a to-be-used preamble based on a preamble corresponding to the downlink beam, and sends the determined to-be-used preamble to the access network device. The access network device sends, to the terminal device based on the preamble of the terminal device, the downlink data of the terminal device that is processed by the core network user plane device and that is included in the fourth data packet.

It should be noted that, in the schematic flowchart of the data transmission method shown in FIG. 3, steps S301 to S309 are a specific procedure of the transmission method for the uplink data of the terminal device, and steps S310 to S314 are a specific procedure of the transmission method for the downlink data of the terminal device. Actually, a communication process may include only transmission of the uplink data, may include only transmission of the downlink data, or may include both transmission of the uplink data and transmission of the downlink data. Therefore, the schematic flowchart of the data transmission method shown in FIG. 3 may include only steps S301 to S309, or include only steps S310 to S314, or include steps S301 to S314. A specific procedure is determined based on an actual communication status. This is not limited in this application.

It should be understood that sequence numbers of the foregoing processes do not indicate an execution sequence. The execution sequence of the processes should be determined based on functions and internal logic of the processes, and should not be construed as any limitation on an implementation process of this embodiment of this application.

In the data transmission method provided in this embodiment of this application, when data is to be transmitted, the core network user plane device obtains the context information of the terminal device based on the identification information of the terminal device that is included in the data packet, and processes the uplink data of the terminal device based on the context information. The core network user plane device needs to retain only the context information of the terminal device. This reduces overheads of small-packet data transmission, and improves data transmission efficiency. In addition, the common data transmission tunnel is established between the core network user plane device and the access network device. During data transmission, the core network control plane device sends the context information of the plurality of terminal devices in the communications system to the core network user plane device. When the terminal device enters the idle state, only the context information of the terminal device needs to be retained, and tunnel information does not need to be retained. This reduces an information storage amount. When transmitting data, the terminal device transmits the data together with the identification information of the terminal device. Because the context information of the terminal device is stored in the core network user plane device, data transmission may be directly performed between the access network device and the core network user plane device.

Figure 5:
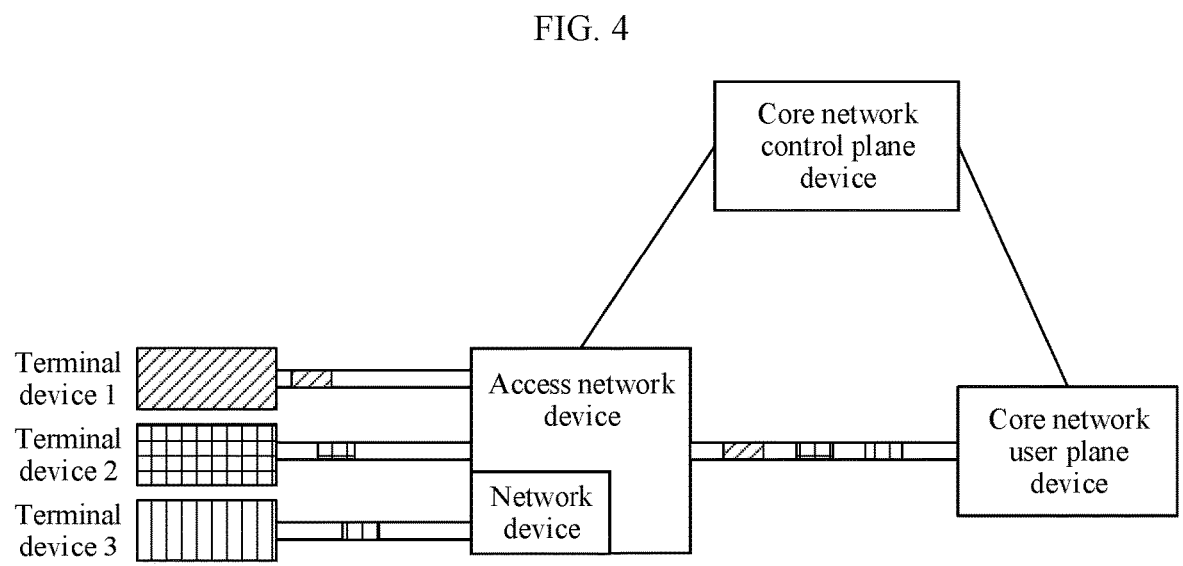
FIG. 5 is a schematic architectural diagram of an application scenario according to another embodiment of this application.

FIG. 5 is a schematic architectural diagram of an application scenario according to another embodiment of this application. In this embodiment of this application, functions of a network device are integrated into an access network device. As shown in FIG. 5, a terminal device 1, a terminal device 2, and a terminal device 3 are separately connected to the access network device. The access network device receives data of the terminal device 1, the terminal device 2, and the terminal device 3, and transmits the data to a core network user plane device on a common data tunnel between the access network device and the core network user plane device. Because the data is transmitted on the common data tunnel, a first data packet includes the data and identification information of the terminal device during data transmission, and the first data packet is sent to the core network user plane device. Before data transmission, a core network control plane device sends stored context information of the terminal device to the access network device. After receiving the first data packet, the access network device obtains the context information of the terminal device based on the identification information of the terminal device in the first data packet, and processes the data in the first data packet of the terminal device based on the context information of the terminal device. Processed uplink data is transmitted to the core network user plane device on a first data tunnel, to complete the data transmission.

Figure 6:
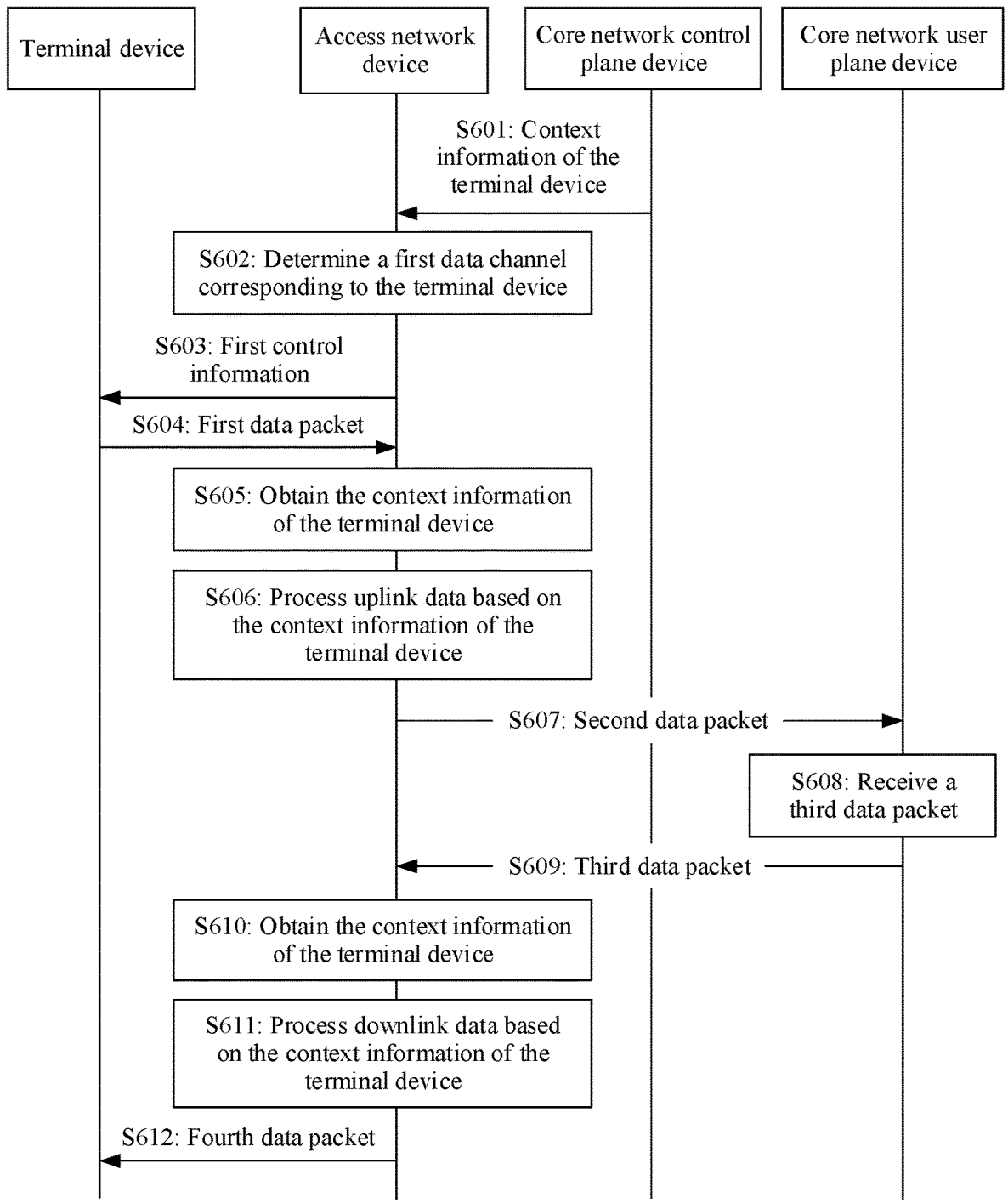
FIG. 6 is a schematic flowchart of a data transmission method according to another embodiment of this application.

FIG. 6 is a schematic flowchart of a data transmission method 600 according to another embodiment of this application. The method 600 may be applied to the architecture shown in FIG. 5. The method 600 includes steps S601 to S612, where steps S601 to S603 and S607 to S612 are optional steps. The following describes the steps in detail.

S601: A core network control plane device sends context information of a terminal device to an access network device.

When the terminal device enters an idle state, to reduce overheads of small-packet data transmission, context information of all terminal devices in the communications system may be stored in the core network control plane device. The context information of each terminal device is in a one-to-one correspondence with the terminal device, and is uniquely identified by identification information of the terminal device.

Before the terminal device performs data transmission, the core network control plane device sends the stored context information of the terminal device to the access network device, and the access network device stores the context information of the terminal device. In a data transmission process, the access network device may directly process data based on the stored context of the terminal device, and does not need to determine the context information of the terminal device from the core network control plane device.

Optionally, the context information of the terminal device may be sent by the core network control plane device to the access network device before the data transmission. Alternatively, the context information of the terminal device may be sent together with to-be-transmitted data during the data transmission. Alternatively, the core network control plane device may send the context information of the terminal device to the access network device when receiving a terminal device context request sent by the access network device. This is not limited in this embodiment of this application.

S602: The access network device determines a first data tunnel corresponding to the terminal device.

Optionally, at least one common data tunnel is established between the access network device and the core network user plane device to perform data transmission. Establishment of the common data tunnel may be completed before access of the terminal device. In addition, a plurality of access network devices may establish the common data tunnel with the core network user plane device, so that the terminal device may use the common data tunnel when moving within coverage of the plurality of access network devices. If a quantity of common data tunnels between each of the plurality of access network devices and the core network user plane device is the same, and identification information of the common data tunnel is the same, when a same terminal device moves from one access network device to another access network device, the terminal device may use a correct common data tunnel.

Before the data transmission, the access network device determines, for the terminal device, the first data tunnel used for the data transmission.

Optionally, when the terminal devices in the communications system share one data tunnel, in other words, there is only one common data tunnel established between the access network device and the core network user plane device, step S602 may not be performed.

Optionally, the first data tunnel of the terminal device may be determined by the core network control plane device. In this case, step S602 may be: The core network control plane device determines the first data tunnel corresponding to the terminal device. Correspondingly, step S602 further includes: The core network control plane device sends identification information of the determined first data tunnel to the access network device.

S603: The access network device sends first control information to the terminal device.

Optionally, the first control information may include the identification information of the terminal device.

Optionally, the identification information of the terminal device may be allocated by the access network device, or may be allocated by the core network control plane device, or may be a TMSI of the terminal device, provided that the terminal device can be effectively distinguished. This is not limited in this application.

It should be understood that when the identification information of the terminal device is the TMSI of the terminal device, the first control information may not include the identification information of the terminal device.

Optionally, the terminal device receives the first control information sent by the access network device, where the first control information further includes an RRC configuration index of the terminal device and/or the identification information of the first data tunnel corresponding to the terminal device. The terminal device determines RRC configuration information corresponding to the RRC configuration index. The RRC configuration information may be predefined, or may be obtained from the access network device. In addition, the RRC configuration information and the RRC configuration index may be simultaneously obtained from the access network device, or may be separately obtained from the access network device by using different messages.

When the terminal device communicates with the access network device, common information may be configured for the terminal devices in the communications system by using RRC, and an RRC configuration information table may be established. The RRC configuration index corresponds to one group of RRC configuration information. The configuration information table may be searched for the corresponding RRC configuration information based on the RRC configuration index, and subsequent data transmission is performed based on the RRC configuration information. In this manner, the access network device may maintain a specific quantity of pieces of common RRC configuration information to serve a large quantity of terminal devices, and does not need to store dedicated RRC configuration information for each terminal device. This greatly reduces an information storage amount, and reduces RRC configuration storage overheads. In addition, when configuring the RRC configuration index for the terminal device, the access network device may further configure, for the terminal device, the RRC configuration information corresponding to the RRC configuration index. Alternatively, the RRC configuration index and the RRC configuration information corresponding to the RRC configuration index are configured for the terminal device by using different messages or in different manners. This is not limited in this embodiment of this application.

Optionally, to ensure that different access network devices can determine the unique RRC configuration information based on the RRC configuration index when the terminal device moves between the different access network devices, the different access network devices need to synchronously store a correspondence between the RRC configuration information and the RRC configuration index.

For example, a network operation and maintenance device may configure, for the different access network devices, the same RRC configuration information and the RRC configuration index corresponding to the RRC configuration information. Alternatively, the access network device obtains, from the core network control plane device, the RRC configuration information and the RRC configuration index corresponding to the RRC configuration information, so that the different access network devices obtain the same configuration information. Alternatively, any one of the plurality of access network devices sends, to another access network device, the stored RRC configuration information and the RRC configuration index corresponding to the RRC configuration information, so that the another access network device obtains the same RRC configuration information and the same corresponding RRC configuration index as the access network device.

Because a terminal device in the communications system performs data transmission on the common data tunnel, the common information may be configured for the terminal device in the communications system by using the RRC, and the RRC configuration information table may be established. The RRC configuration index corresponds to one group of RRC configuration information. The configuration information table may be searched for the corresponding RRC configuration information based on the RRC configuration index, and the subsequent data transmission is performed based on the RRC configuration information. This greatly reduces the information storage amount and reduces overheads.

Optionally, the RRC configuration information includes one or more logical channels, and packet data convergence protocol (packet data convergence protocol, PDCP) and/or radio link control (radio link control, RLC) configuration information corresponding to each logical channel. A logical channel and PDCP and/or RLC configuration information that correspond to the RRC configuration index may be sent to the terminal device together with the configuration index, or may be a configuration defined in a protocol. This is not limited in this application. For example, Table 1 lists RRC configuration information corresponding to one RRC configuration index.

It should be understood that when there is only one common data tunnel, the first control information may not include the identification information of the first data tunnel corresponding to the terminal device.

Optionally, the first control information further includes information about a valid area of the terminal device, and the valid area may include a group of cells. The valid area may be determined by the access network device, or may be determined based on a valid area sent by the core network control plane device. These cells in the valid area may belong to a same base station or different base stations. When performing data output in the valid area, the terminal device may use information sent in the first control information. Otherwise, the information cannot be used for data transmission. A network device ensures that the access network devices have the same correspondence between the RRC configuration index and the RRC configuration information in the valid area. If there are a plurality of common data tunnels, it is ensured that the access network device and the core network user plane device have a same common data tunnel configuration in the valid area, to ensure that when moving in the valid area, the terminal device can use the RRC configuration information and the common data tunnels to perform data transmission.

To reduce overheads of data transmission, when no data needs to be transmitted, dedicated configuration information and dedicated data tunnel information of the terminal device do not need to be stored. When needing to perform data transmission, the terminal device performs the data transmission on the at least one common data tunnel established between the access network device and the core network user plane device, and no dedicated data tunnel needs to be established. Step S601 to step S603 are performed to complete preparation of the data transmission, and a first data packet including the identification information of the terminal device and uplink data that needs to be transmitted is formed.

S604: An access network device receives the first data packet sent by the terminal device.

It should be noted that, whether the access network device to which the terminal device sends the first data packet is the access network device that sends the first control information to the terminal device in step S603 or another access network device depends on a moving status of the terminal device. This is not limited in this embodiment of this application. The terminal device sends the first data packet to the access network device based on the first control information. The first control information includes the information about the valid area of the terminal device, and the terminal device determines, based on the information about the valid area, whether the first data packet is capable of being sent.

First, the terminal device checks whether a cell in which the terminal device is currently located belongs to the valid area. If the cell in which the terminal device is currently located belongs to the valid area, the terminal device sends the first data packet to the access network device in the following format.

For example, the format of the first data packet is shown in FIG. 4. As shown in FIG. 4, the uplink data packet includes the to-be-transmitted uplink data and the identification information of the terminal device. When the first control information includes the RRC configuration index and/or the identification information of the first data tunnel corresponding to the first terminal device, the first data packet further includes the RRC configuration index of the terminal device and the identification information of the first data tunnel used by the terminal device to perform data transmission.

Optionally, when the first control information does not include the RRC configuration index of the terminal device and the identification information of the first data tunnel corresponding to the terminal device, the first data packet does not include the RRC configuration index of the terminal device and the identification information of the first data tunnel corresponding to the terminal device.

Optionally, before the terminal device sends the first data packet to the access network device, the access network device receives a preamble sent by the terminal device, and allocates a grant and a C-RNTI of the terminal device to the terminal device based on the preamble. The terminal device sends the first data packet to the access network device based on the allocated grant.

Because preamble information is not unique, when a plurality of terminal devices simultaneously send a preamble to the access network device, the access network device allocates a grant and a C-RNTI to the corresponding terminal devices based on the preamble. For example, when preambles sent by a terminal device #1 and a terminal device #2 to the access network device are the same, the access network device allocates a grant to the terminal device #1 and the terminal device #2. In this case, the terminal device #1 and the terminal device #2 perform data transmission on a same resource. This causes contention, and only one terminal device successfully performs data transmission at most. To determine whether a terminal device successfully performs data transmission, the access network device sends contention resolution information. If the terminal device #1 receives the contention resolution information, the terminal device #1 successfully performs data transmission. Similarly, when the terminal device #2 receives the contention resolution information, the terminal device #2 successfully performs data transmission. Alternatively, if neither the terminal device #1 nor the terminal device #2 receives the contention resolution information, neither the terminal device #1 nor the terminal device #2 successfully performs data transmission.

Optionally, when the terminal device sends first data, a first timer is started, and the C-RNTI of the terminal device is monitored until the first timer expires.

When the cell in which the terminal device is currently located does not belong to the valid area, the terminal device initiates an RRC connection establishment request to the access network device, to request to establish an RRC connection to transmit the uplink data.

Optionally, a MAC control element carrying the RRC configuration index and the identification information of the terminal device may be sent.

S605: The access network device obtains the context information of the terminal device.

After receiving the first data packet sent by the terminal device, and before processing the uplink data packet in the first data packet, the access network device first obtains the context information of the terminal device from the stored context information of the plurality of terminal devices based on the identification information of the terminal device in the first data packet. The identification information of the terminal device is used to uniquely determine the context information of the terminal device.

S606: The access network device processes the uplink data based on the context information of the terminal device.

After determining the context information of the terminal device based on the identification information of the terminal device, the access network device processes the uplink data in the first data packet based on the context information of the terminal device.

For example, the context information of the terminal device includes security context information of the terminal device and/or compression context information of the terminal device. The access network device decrypts the uplink data of the terminal device based on the security context information of the terminal device, and/or decompresses the uplink data of the terminal device based on the compression context information of the terminal device.

Optionally, when the first data packet includes the RRC configuration index of the terminal device, the RRC configuration information is first determined based on the RRC configuration index. The access network device processes, based on the RRC configuration information, the uplink data included in the first data packet, and then processes the uplink data in the first data packet based on the context information of the terminal device.

For example, if the RLC configuration information is summarized and included in the RRC configuration information, the access network device removes an RLC header of the first data packet, uses RLC payload information as the first data packet, and performs an RLC-related status report operation. Alternatively, for example, if the RLC configuration information and the PDCP configuration information are summarized and included in the RRC configuration information, the access network device removes RLC and PDCP headers of the first data packet, and uses PDCP payload information as the first data packet.

S607: The access network device sends a second data packet to the core network user plane device.

Optionally, after processing the uplink data in the first data packet based on the context information corresponding to the terminal device, the access network device sends the second data packet to the core network user plane device on the first data tunnel corresponding to the terminal device, where the second data packet includes the processed uplink data of the terminal device.

Optionally, when the first data packet includes the RRC configuration index of the terminal device, the access network device determines, based on the RRC configuration index, the RRC configuration information corresponding to the terminal device, for example, the PDCP or RLC configuration information, and performs data transmission based on the RRC configuration information corresponding to the terminal device.

Optionally, when the access network device sends the second data packet to the core network user plane device, the second data packet further includes information about the cell in which the terminal device is currently located and/or the C-RNTI of the terminal device.

Steps S601 to S607 are a transmission method for the uplink data of the terminal device. In some possible alternative manners, transmission of downlink data of the terminal device is further included. A transmission method for the downlink data of the terminal device is described in detail below with reference to steps S608 to S612.

S608: The core network user plane device receives a third data packet of the terminal device.

The third data packet includes the downlink data of the terminal device and the identification information of the terminal device.

S609: The access network device receives the third data packet sent by the core network user plane device.

After receiving the downlink data of the terminal device, the core network user plane device sends the downlink data of the terminal device together with the identification information of the terminal device to the access network device.

S610: The access network device obtains the context information of the terminal device.

After receiving the third data packet of the terminal device, and before processing a downlink data packet in the third data packet, the access network device first obtains the context information of the terminal device from the stored context information of the plurality of terminal devices based on the identification information of the terminal device in the third data packet. The identification information of the terminal device is used to uniquely determine the context information of the terminal device.

S611: The access network device processes the downlink data based on the context information of the terminal device.

For example, the context information of the terminal device includes the security context information of the terminal device and/or the compression context information of the terminal device. The access network device encrypts the downlink data of the terminal device based on the security context information of the terminal device, and/or compresses the downlink data of the terminal device based on the compression context information of the terminal device.

S612: The access network device sends a fourth data packet to the terminal device.

The fourth data packet includes the processed downlink data of the terminal device.

Optionally, the access network device first determines whether the C-RNTI of the terminal device is still valid. If the C-RNTI of the terminal device is still valid, the access network device schedules the terminal device by using the C-RNTI of the terminal device.

If the C-RNTI of the terminal device is invalid, the access network device sends a paging message to the terminal device, where the paging message includes the identification information of the terminal device and preamble information of the terminal device, and the preamble information includes a list of a preamble and information about a corresponding beam. After receiving the paging message, the terminal device determines a downlink beam used by the terminal device, determines a to-be-used preamble based on a preamble corresponding to the downlink beam, and sends the determined to-be-used preamble to the access network device. The access network device sends the fourth data packet to the terminal device based on the preamble of the terminal device.

It should be noted that, in the schematic flowchart of the data transmission method shown in FIG. 6, steps S601 to S607 are a specific procedure of the transmission method for the uplink data of the terminal device, and steps S608 to S612 are a specific procedure of the transmission method for the downlink data of the terminal device. Actually, a communication process may include only transmission of the uplink data, may include only transmission of the downlink data, or may include both transmission of the uplink data and transmission of the downlink data. Therefore, the schematic flowchart of the data transmission method shown in FIG. 6 may include only steps S601 to S607, or include only steps S608 to S612, or include steps S601 to S612. A specific procedure is determined based on an actual communication status. This is not limited in this application.

It should be understood that sequence numbers of the foregoing processes do not indicate an execution sequence. The execution sequence of the processes should be determined based on functions and internal logic of the processes, and should not be construed as any limitation on an implementation process of this embodiment of this application.

In the data transmission method provided in this embodiment of this application, when data is to be transmitted, the access network device obtains the context information of the terminal device based on the identification information of the terminal device that is included in the data packet, and processes the uplink data of the terminal device based on the context information. The access network device needs to retain only the context information of the terminal device. This reduces overheads of small-packet data transmission, and improves data transmission efficiency. In addition, the common data transmission tunnel is established between the core network user plane device and the access network device, and a large amount of small-packet data is processed on a common bearer. This reduces a quantity of dedicated interfaces for the terminal device that are between network devices. During data transmission, the core network control plane device sends the context information of the plurality of terminal devices in the communications system to the access network device. When the terminal device enters the idle state, only the context information of the terminal device needs to be retained, and tunnel information does not need to be retained. This reduces an information storage amount of the access network device. When transmitting data, the terminal device transmits the data together with the identification information of the terminal device. Because the context information of the terminal device is stored in the access network device, data transmission may be directly performed between the access network device and the core network user plane device.

Figure 7:
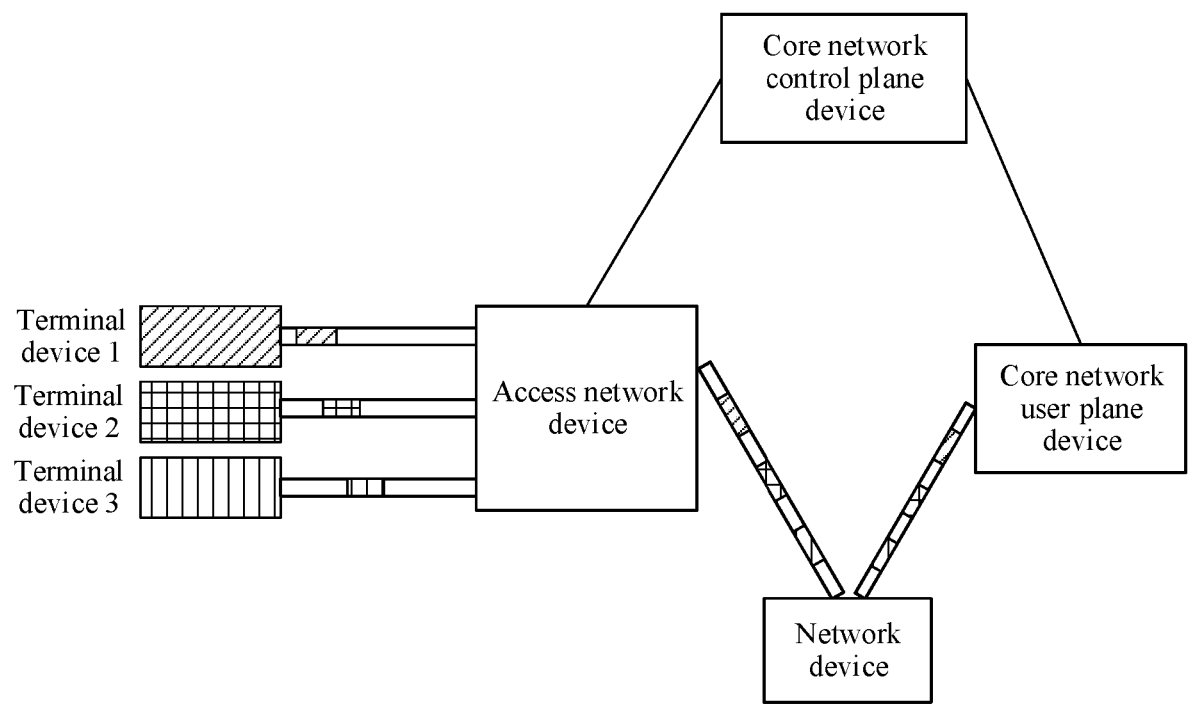
FIG. 7 is a schematic architectural diagram of an application scenario according to still another embodiment of this application.

FIG. 7 is a schematic architectural diagram of an application scenario according to still another embodiment of this application. In this embodiment of this application, a network device is independently deployed. As shown in FIG. 7, a terminal device 1, a terminal device 2, and a terminal device 3 are separately connected to an access network device. The access network device receives data of the terminal device 1, the terminal device 2, and the terminal device 3, and transmits the data to a core network user plane device on a common data tunnel between the access network device and the core network user plane device. The common data tunnel includes a first partial data tunnel between the access network device and the network device and a second partial data tunnel between the network device and the core network user plane device. Because the data is transmitted on the common data tunnel, a first data packet includes the data and identification information of the terminal device during data transmission, and the first data packet is sent to the core network user plane device. Before data transmission, a core network control plane device sends stored context information of the terminal device to the network device. After receiving the first data packet sent by the access network device on the first partial data tunnel, the network device obtains the context information of the terminal device based on the identification information of the terminal device in the first data packet, and processes the data in the first data packet of the terminal device based on the context information of the terminal device. Processed uplink data is transmitted to the core network user plane device on the second partial data tunnel, to complete the data transmission.

Figure 8A:
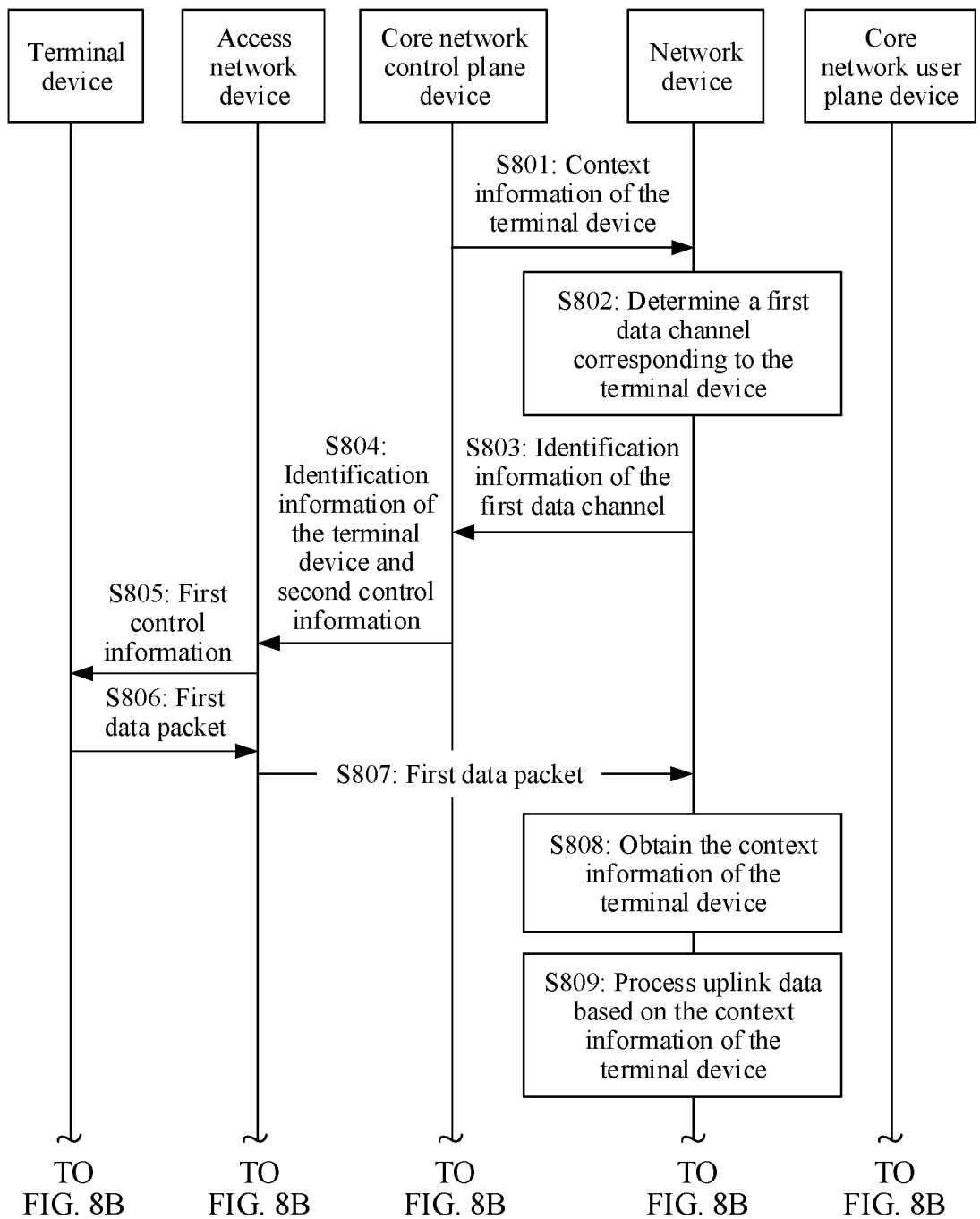
FIG. 8A and FIG. 8B are a schematic flowchart of a data transmission method according to still another embodiment of this application.
Figure 8B:
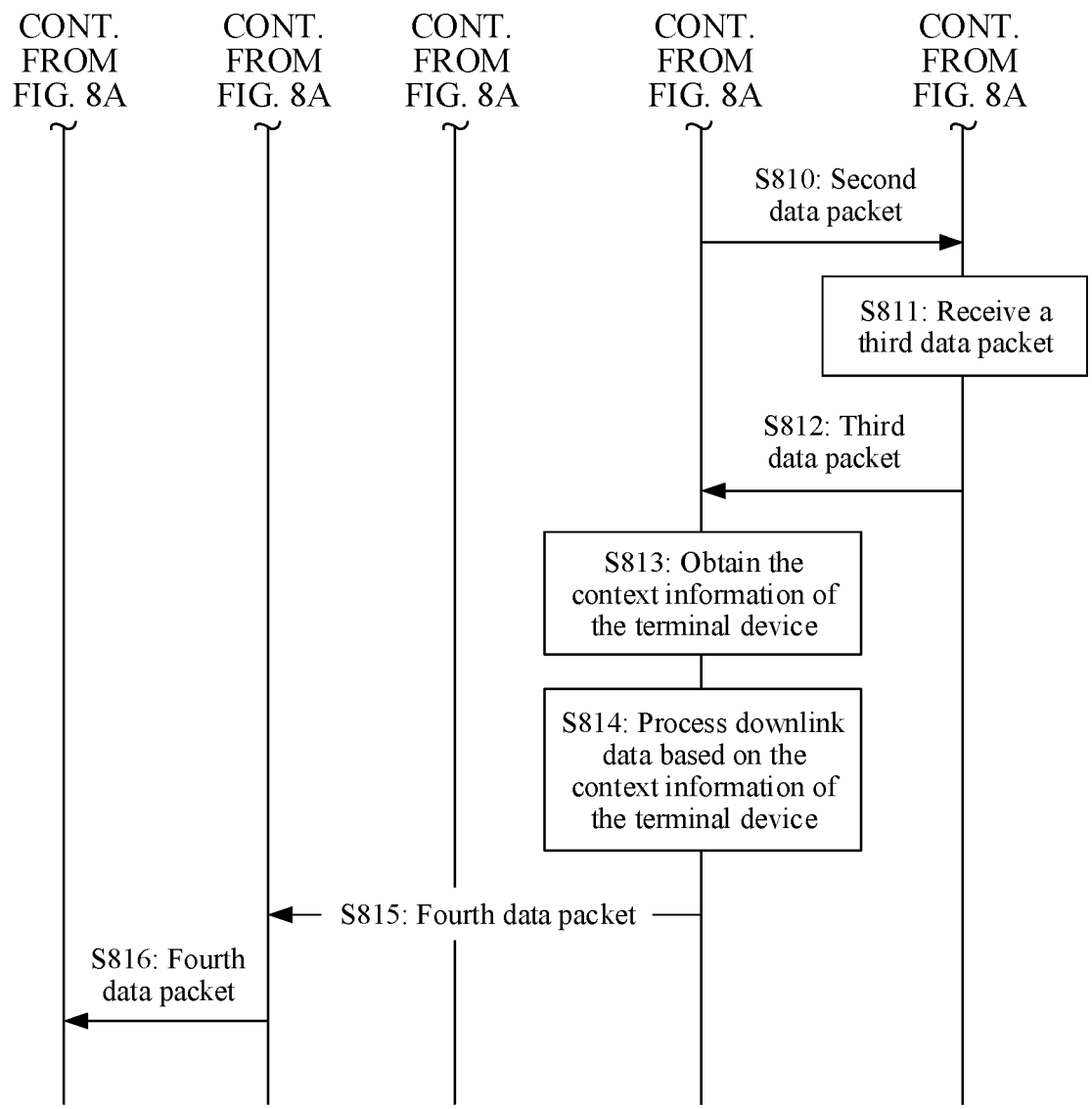

FIG. 8A and FIG. 8B are a schematic flowchart of a data transmission method 800 according to still another embodiment of this application. The method 800 may be applied to the architecture shown in FIG. 7. The method 800 may include steps S801 to S816, where steps S801 to S806 and S810 to S816 are optional steps. The following describes the steps in detail.

S801: A core network control plane device sends context information of a terminal device to a network device.

When the terminal device enters an idle state, to reduce overheads of small-packet data transmission, context information of all terminal devices in the communications system may be stored in the core network control plane device. The context information of each terminal device is in a one-to-one correspondence with the terminal device, and is uniquely identified by identification information of the terminal device.

Before the terminal device performs data transmission, the core network control plane device sends the stored context information of the terminal device to the network device, and the network device stores the context information of the terminal device. In a data transmission process, the network device may directly process data based on the stored context of the terminal device, and does not need to determine the context information of the terminal device from the core network control plane device.

Optionally, the context information of the terminal device may be sent by the core network control plane device to the network device before the data transmission. Alternatively, the context information of the terminal device may be sent together with to-be-transmitted data during the data transmission. Alternatively, the core network control plane device may send the context information of the terminal device to the network device when receiving a terminal device context request sent by the network device. This is not limited in this embodiment of this application.

S802: The network device determines a first data tunnel corresponding to the terminal device.

At least one common data tunnel is established between an access network device and a core network user plane device to perform data transmission. Each data tunnel in the at least one common data tunnel includes a first partial data tunnel and a second partial data tunnel, the first partial data tunnel is a data tunnel between the access network device and the network device, and the second partial data tunnel is a tunnel between the network device and the core network user plane device.

Optionally, establishment of the common data tunnel may be completed before access of the terminal device. In addition, a plurality of access network devices may establish the common data tunnel with the core network user plane device, so that the terminal device may use the common data tunnel when moving within coverage of the plurality of access network devices. If a quantity of common data tunnels between each of the plurality of access network devices and the core network user plane device is the same, and identification information of the common data tunnel is the same, when a same terminal device moves from one access network device to another access network device, the terminal device may use a correct common data tunnel.

Before the data transmission, the network device determines, for the terminal device, the first data tunnel used for the data transmission.

S803: The network device sends identification information of the determined first data tunnel to the core network control plane device.

It should be noted that the identification information of the first data tunnel may uniquely identify the first data tunnel. For example, the identification information of the first data tunnel may be address information of the data tunnel, or may be identification information of the data tunnel, provided that the first data tunnel can be effectively distinguished. This is not limited in this application.

It should be further noted that when the terminal devices in the communications system share one data tunnel, in other words, there is only one common data tunnel between the access network device and the network device and between the network device and the core network user plane device, steps S802 and S803 may not be performed.

Optionally, in some alternative implementations, the first data tunnel corresponding to the terminal device may be determined by the core network control plane device. In this case, step S802 may be: The core network control plane device determines the first data tunnel corresponding to the terminal device. Correspondingly, step S803 is: The core network control plane device sends the identification information of the determined first data tunnel to the network device.

S804: The core network control plane device sends the identification information of the terminal device and second control information to the network device.

The identification information of the terminal device is in a one-to-one correspondence with the terminal device, and the identification information of the terminal device may uniquely identify the terminal device.

The second control information includes the identification information of the first data tunnel used by the terminal device, for example, the address information of the first data tunnel or flag information of the first data tunnel.

Optionally, the second control information may further include information about a valid area of the terminal device.

S805: The access network device sends first control information to the terminal device.

Optionally, the first control information may include the identification information of the terminal device.

The identification information of the terminal device may be allocated by the core network control plane device, or may be allocated by the network device, or may be a TMSI of the terminal device, provided that the terminal device can be effectively distinguished. This is not limited in this application.

Optionally, the first control information further includes an RRC configuration index of the terminal device and/or the identification information of the first data tunnel corresponding to the terminal device.

Optionally, the terminal device receives the first control information sent by the access network device, where the first control information further includes the RRC configuration index of the terminal device and/or the identification information of the first data tunnel corresponding to the terminal device. The terminal device determines RRC configuration information corresponding to the RRC configuration index. The RRC configuration information may be predefined, or may be obtained from the access network device. In addition, the RRC configuration information and the RRC configuration index may be simultaneously obtained from the access network device, or may be separately obtained from the access network device by using different messages.

When the terminal device communicates with the access network device, common information may be configured for the terminal devices in the communications system by using RRC, and an RRC configuration information table may be established. The RRC configuration index corresponds to one group of RRC configuration information. The configuration information table may be searched for the corresponding RRC configuration information based on the RRC configuration index, and subsequent data transmission is performed based on the RRC configuration information. In this manner, the access network device may maintain a specific quantity of pieces of common RRC configuration information to serve a large quantity of terminal devices, and does not need to store dedicated RRC configuration information for each terminal device. This greatly reduces an information storage amount, and reduces RRC configuration storage overheads. In addition, when configuring the RRC configuration index for the terminal device, the access network device may further configure, for the terminal device, the RRC configuration information corresponding to the RRC configuration index. Alternatively, the RRC configuration index and the RRC configuration information corresponding to the RRC configuration index are configured for the terminal device by using different messages or in different manners. This is not limited in this embodiment of this application.

Optionally, to ensure that different access network devices can determine the unique RRC configuration information based on the RRC configuration index when the terminal device moves between the different access network devices, the different access network devices need to synchronously store a correspondence between the RRC configuration information and the RRC configuration index.

For example, a network operation and maintenance device may configure, for the different access network devices, the same RRC configuration information and the RRC configuration index corresponding to the RRC configuration information. Alternatively, the access network device obtains, from the core network control plane device, the RRC configuration information and the RRC configuration index corresponding to the RRC configuration information, so that the different access network devices obtain the same configuration information. Alternatively, any one of the plurality of access network devices sends, to another access network device, the stored RRC configuration information and the RRC configuration index corresponding to the RRC configuration information, so that the another access network device obtains the same RRC configuration information and the same corresponding RRC configuration index as the access network device.

Optionally, the RRC configuration information includes one or more logical channels, and packet data convergence protocol (packet data convergence protocol, PDCP) and/or radio link control (radio link control, RLC) configuration information corresponding to each logical channel. A logical channel and PDCP and/or RLC configuration information that correspond to the RRC configuration index may be sent to the terminal device together with the configuration index, or may be a configuration defined in a protocol. This is not limited in this application. For example, Table 1 lists an RRC configuration corresponding to the RRC configuration index.

It should be understood that when there is only one common data tunnel, the first control information may not include the identification information of the first data tunnel corresponding to the terminal device.

Optionally, the first control information further includes the information about the valid area of the terminal device, and the valid area may include a group of cells. The valid area may be determined by the access network device, or may be determined based on a valid area sent by the core network control plane device. These cells in the valid area may belong to a same base station or different base stations. When performing data output in the valid area, the terminal device may use information sent in the first control information. Otherwise, the information cannot be used for data transmission. The network device ensures that the access network devices have the same correspondence between the RRC configuration index and the RRC configuration information in the valid area. If there are a plurality of common data tunnels, it is ensured that the access network device and the core network user plane device have a same common data tunnel configuration in the valid area, to ensure that when moving in the valid area, the terminal device can use the RRC configuration information and the common data tunnels to perform data transmission.

To reduce overheads of data transmission, when no data needs to be transmitted, dedicated configuration information and dedicated data tunnel information of the terminal device do not need to be stored. When needing to perform data transmission, the terminal device performs the data transmission on the at least one common data tunnel established between the access network device and the core network user plane device, and no dedicated data tunnel needs to be established. Step S801 to step S805 are performed to complete preparation of the data transmission, and an uplink data packet including the identification information of the terminal device and uplink data that needs to be transmitted is formed.

S806: The terminal device sends the uplink data packet to an access network device.

It should be noted that, whether the access network device to which the terminal device sends the uplink data packet is the access network device that sends the first control information to the terminal device in step S805 or another access network device depends on a moving status of the terminal device. This is not limited in this embodiment of this application.

Optionally, the terminal device sends the uplink data packet to the access network device based on the first control information, where the uplink data packet further includes the RRC configuration index and/or the identification information of the first data tunnel. For example, the uplink data packet is a MAC PDU, the RRC configuration index and/or the identification information of the first data tunnel may be used as a MAC CE, and the MAC PDU includes the MAC CE and a data part of the uplink data packet. Alternatively, the RRC configuration index and/or the identification information of the first data tunnel are/is carried on a signaling bearer to be sent, and a MAC PDU includes the signaling bearer and a data part bearer of the uplink data packet.

Optionally, the access network device determines an RRC configuration of the terminal device based on the RRC configuration index, and processes the uplink data packet based on the RRC configuration to generate a first data packet. For example, if the RLC configuration information is summarized and included in the RRC configuration information, the access network device removes an RLC header of the uplink data packet, uses RLC payload information as the first data packet, and performs an RLC-related status report operation. Alternatively, for example, if the RLC configuration information and the PDCP configuration information are summarized and included in the RRC configuration information, the access network device removes RLC and PDCP headers of the uplink data packet, and uses PDCP payload information as the first data packet.

Alternatively, the access network device selects the first data tunnel based on the identification information of the first data tunnel, where the first data tunnel is used to send the first data packet to the core network user plane device.

Optionally, the terminal device checks whether a cell in which the terminal device is currently located belongs to the valid area. If the cell in which the terminal device is currently located belongs to the valid area, the terminal device sends the uplink data packet to the access network device based on a configuration of the first control information. If the cell in which the terminal device is currently located does not belong to the valid area, the uplink data packet cannot be directly sent, and the terminal device needs to first initiate a connection establishment request, and then send the uplink data packet after a connection is established.

A format of the uplink data packet is shown in FIG. 4. As shown in FIG. 4, the uplink data packet includes the to-be-transmitted uplink data and the identification information of the terminal device. When the first control information includes the RRC configuration index or the identification information of the first data tunnel, the uplink data packet further includes the RRC configuration index of the terminal device and the identification information of the first data tunnel that corresponds to the terminal device and that is used for data transmission.

Optionally, when the first control information does not include the RRC configuration index or the identification information of the first data tunnel, the uplink data packet includes only the identification information of the terminal device and the uplink data.

It should be understood that when the first control information does not include the RRC configuration index of the terminal device and the identification information of the first data tunnel corresponding to the terminal device, the uplink data packet does not include the RRC configuration index of the terminal device and the identification information of the first data tunnel corresponding to the terminal device.

Optionally, before the terminal device sends the uplink data packet to the access network device, the terminal device sends a preamble to the access network device, and the access network device allocates a grant and a C-RNTI of the terminal device to the terminal device based on the preamble. The terminal device sends the uplink data packet to the access network device based on the allocated grant.

Because preamble information is not unique, when a plurality of terminal devices simultaneously send a preamble to the access network device, the access network device allocates a grant and a C-RNTI to the corresponding terminal devices based on the preamble. For example, when preambles sent by a terminal device #1 and a terminal device #2 to the access network device are the same, the access network device allocates a grant to the terminal device #1 and the terminal device #2. In this case, the terminal device #1 and the terminal device #2 perform data transmission on a same resource. This causes contention, and only one terminal device successfully performs data transmission at most. To determine whether a terminal device successfully performs data transmission, the access network device sends contention resolution information. If the terminal device #1 receives the contention resolution information, the terminal device #1 successfully performs data transmission. Similarly, when the terminal device #2 receives the contention resolution information, the terminal device #2 successfully performs data transmission. Alternatively, if neither the terminal device #1 nor the terminal device #2 receives the contention resolution information, neither the terminal device #1 nor the terminal device #2 successfully performs data transmission.

Optionally, when the terminal device sends first data, a first timer is started, and the C-RNTI of the terminal device is monitored until the first timer expires.

Optionally, when the cell in which the terminal device is currently located does not belong to the valid area, the terminal device initiates an RRC connection establishment request to an access network, to request to establish an RRC connection to transmit the uplink data.

Optionally, a MAC control element carrying the RRC configuration index and the identification information of the terminal device may be sent.

S807: The access network device sends the first data packet to the network device.

The network device receives, on the first partial data tunnel of the first data tunnel, the first data packet sent by the access network device.

Optionally, when the first data packet includes the identification information of the first data tunnel corresponding to the terminal device, the access network device sends the first data packet to the network device on the first data tunnel.

Optionally, when the first data packet includes the RRC configuration index of the terminal device, the access network device determines, based on the RRC configuration index, the RRC configuration information corresponding to the terminal device, for example, the PDCP or RLC configuration information, and performs data transmission based on the RRC configuration information corresponding to the terminal device. Because different access network devices have synchronized the correspondence between the RRC configuration information and the RRC configuration index, the access network device herein may determine the RRC configuration information based on the RRC configuration index even if the access network device is not the access network device that sends the first control information to the terminal device.

Optionally, when the access network device sends the first data packet to the network device, the first data packet further includes information about the cell in which the terminal device is currently located and/or the C-RNTI of the terminal device.

S808: The network device obtains the context information of the terminal device.

After receiving the first data packet sent by the access network device, and before processing the uplink data packet in the first data packet, the network device first obtains the context information of the terminal device from the stored context information of the plurality of terminal devices based on the identification information of the terminal device in the first data packet. The identification information of the terminal device is used to uniquely determine the context information of the terminal device.

S809: The network device processes the uplink data based on the context information of the terminal device.

After determining the context information of the terminal device based on the identification information of the terminal device, the core network user plane device processes the uplink data in the first data packet based on the context information of the terminal device.

For example, the context information of the terminal device includes security context information of the terminal device and/or compression context information of the terminal device. The network device decrypts the uplink data of the terminal device based on the security context information of the terminal device, and/or decompresses the uplink data of the terminal device based on the compression context information of the terminal device.

S810: The network device sends a second data packet to the core network user plane device.

After processing the uplink data in the first data packet based on the context information of the terminal device, the network device sends the second data packet to the core network user plane device on the second partial data tunnel of the first data tunnel corresponding to the terminal device, where the second data packet includes processed downlink data of the terminal device.

Optionally, when the first data packet includes the RRC configuration index of the terminal device, the access network device determines, based on the RRC configuration index, the RRC configuration information corresponding to the terminal device, for example, the PDCP or RLC configuration information, and performs data transmission based on the RRC configuration information corresponding to the terminal device.

Optionally, when the network device sends the second data packet to the core network user plane device, the second data packet further includes the information about the cell in which the terminal device is currently located and/or the C-RNTI of the terminal device.

Steps S801 to S810 are a transmission method for the uplink data of the terminal device. In some possible alternative manners, transmission of downlink data of the terminal device is further included. A transmission method for the downlink data of the terminal device is described in detail below with reference to steps S811 to S816.

S811: The core network user plane device receives a third data packet of the terminal device.

The third data packet includes the downlink data of the terminal device and the identification information of the terminal device.

S812: The core network user plane device sends the third data packet to the network device.

The core network user plane device receives the third data packet of the terminal device, and sends the third data packet of the terminal to the network device on the second partial data tunnel that is in the first data tunnel corresponding to the terminal device and that is between the network device and the core network user plane device.

S813: The network device obtains the context information of the terminal device.

After receiving the third data packet of the terminal device, and before processing a downlink data packet in the third data packet, the network device first obtains the context information of the terminal device from the stored context information of the plurality of terminal devices based on the identification information of the terminal device in the third data packet. The identification information of the terminal device is used to uniquely determine the context information of the terminal device.

S814: The network device processes the downlink data based on the context information of the terminal device.

For example, the context information of the terminal device includes the security context information of the terminal device and/or the compression context information of the terminal device. The network device encrypts the downlink data of the terminal device based on the security context information of the terminal device, and/or compresses the downlink data of the terminal device based on the compression context information of the terminal device.

S815: The network device sends a fourth data packet to the access network device.

The network device sends the fourth data packet to the access network device on the second partial data tunnel in the common data tunnel.

Optionally, the fourth data packet includes the processed downlink data of the terminal device.

In addition, the fourth data packet further includes first information, and the first information includes the information about the current cell of the terminal device, the identification information of the terminal device or the C-RNTI of the terminal device, a TA list, and an interval between a current moment and a moment of the last data transmission of the terminal device.

S816: The access network device sends the fourth data packet to the terminal device.

Optionally, after determining the terminal device based on the identification information of the terminal device or the C-RNTI of the terminal device in the first information, the access network device determines whether the C-RNTI of the terminal device is still valid. If the C-RNTI of the terminal device is still valid, the access network device schedules the terminal device by using the C-RNTI of the terminal device, and sends, to the terminal device, the downlink data of the terminal device that is processed by the network device and that is included in the fourth data packet.

Optionally, if the C-RNTI of the terminal device is invalid, the access network device sends a paging message to the terminal device, where the paging message includes the identification information of the terminal device and preamble information of the terminal device, and the preamble information includes a list of a preamble and information about a corresponding beam. After receiving the paging message, the terminal device determines a downlink beam used by the terminal device, determines a to-be-used preamble based on a preamble corresponding to the downlink beam, and sends the determined to-be-used preamble to the access network device. The access network device sends, to the terminal device based on the preamble of the terminal device, the downlink data of the terminal device that is processed by the network device and that is included in the fourth data packet.

It should be noted that, in the schematic flowchart of the data transmission method shown in FIG. 8A and FIG. 8B, steps S801 to S810 are a specific procedure of the transmission method for the uplink data of the terminal device, and steps S811 to S816 are a specific procedure of the transmission method for the downlink data of the terminal device. Actually, a communication process may include only transmission of the uplink data, may include only transmission of the downlink data, or may include both transmission of the uplink data and transmission of the downlink data. Therefore, the schematic flowchart of the data transmission method shown in FIG. 8A and FIG. 8B may include only steps S801 to S810, or include only steps S811 to S816, or include steps S801 to S816. A specific procedure is determined based on an actual communication status. This is not limited in this application.

In the data transmission method provided in this embodiment of this application, when data is to be transmitted, the network device obtains the context information of the terminal device based on the identification information of the terminal device that is included in the data packet, and processes the uplink data of the terminal device based on the context information. The network device needs to retain only the context information of the terminal device. This reduces overheads of small-packet data transmission, and improves data transmission efficiency. In addition, the common data transmission tunnel is established between the core network user plane device and the access network device, where the common data transmission tunnel includes the first partial data tunnel between the access network device and the network device and the second partial data tunnel between the network device and the core network user plane device. During data transmission, the core network control plane device sends the context information of the plurality of terminal devices in the communications system to the network device. When the terminal device enters the idle state, only the context information of the terminal device needs to be retained, and tunnel information does not need to be retained. This reduces an information storage amount. When transmitting data, the terminal device transmits the data together with the identification information of the terminal device. Because the context information of the terminal device is stored in the network device, the access network device sends the to-be-transmitted data to the network device on the first partial data tunnel, and the network device processes the to-be-transmitted data based on the context information corresponding to the terminal device, and transmits the processed data to the core network user plane device on the second partial data tunnel.

It should be further understood that the foregoing descriptions are merely intended to help a person skilled in the art better understand the embodiments of this application, but are not intended to limit the scope of the embodiments of this application. It is obvious that a person skilled in the art can make various equivalent modifications or changes based on the examples provided above. Alternatively, any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein.

It should be further understood that sequence numbers of the foregoing processes do not indicate an execution sequence. The execution sequence of the processes should be determined based on functions and internal logic of the processes, and should not be construed as any limitation on an implementation process of this embodiment of this application.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail examples of the data transmission method provided in this application. It may be understood that, to implement the foregoing functions, a communications apparatus includes corresponding hardware structures and/or software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The following describes the communications apparatus provided in this application.

Figure 9:
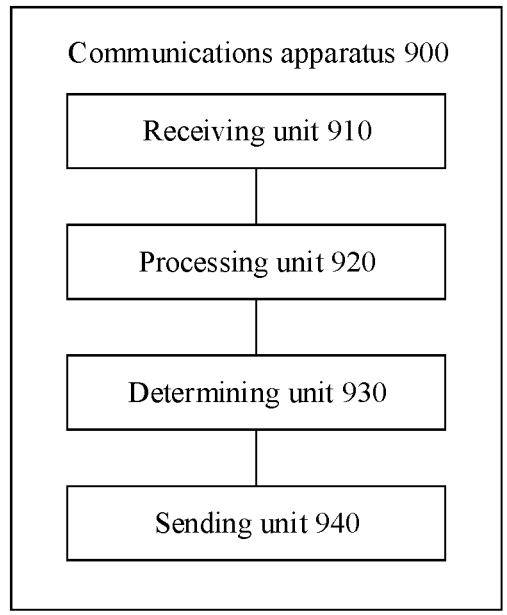
FIG. 9 is a schematic structural diagram of a communications apparatus according to an embodiment of this application.

FIG. 9 is a schematic diagram of a communications apparatus 900 according to an embodiment of this application. It should be understood that the communications apparatus 900 shown in FIG. 9 is merely an example. The communications apparatus 900 in this embodiment of this application may further include other modules or units, may include modules having functions similar to those of modules in FIG. 9, or may not necessarily include all modules in FIG. 9. As shown in FIG. 9, the communications apparatus 900 includes a receiving unit 910 and a processing unit 920.

In some possible implementations, the communications apparatus 900 may be the access network user plane device corresponding to the method 300.

The receiving unit 910 is configured to receive a first data packet sent by an access network device, where the first data packet includes uplink data of a terminal device and identification information of the terminal device.

The processing unit 920 is configured to obtain context information of the terminal device based on the identification information of the terminal device.

The processing unit 920 is further configured to process the uplink data based on the context information of the terminal device.

The core network user plane device in this embodiment of this application obtains the context information of the terminal device, determines the context information of the terminal device based on the received identification information of the terminal device, and processes the uplink data in the received first data packet based on the context information of the terminal device. The core network user plane device stores only security context information. This reduces resource overheads.

Optionally, the receiving unit 910 is further configured to receive the context information of the terminal device from a core network control plane device.

Optionally, the context information of the terminal device includes the security context information of the terminal device and/or compression context information of the terminal device.

Optionally, the processing unit 920 is specifically configured to decrypt the uplink data based on the security context information of the terminal device, and/or the core network user plane device decompresses the uplink data based on the compression context information of the terminal device.

Optionally, the communications apparatus 900 further includes a determining unit 930, configured to determine a first data tunnel corresponding to the terminal device, where the first data tunnel is a data tunnel in at least one common data tunnel. The at least one common data tunnel is located between the core network user plane device and the access network device.

It should be noted that when there is only one common data tunnel, the communications apparatus 900 may not include the determining unit 990.

Optionally, the communications apparatus 900 further includes a sending unit 940, configured to send identification information of the first data tunnel to the core network control plane device.

It should be understood that when there is only one common data tunnel, the sending unit 940 does not need to send the identification information of the first data tunnel to the core network control plane device.

Optionally, the receiving unit 910 is specifically configured to receive, on the first data tunnel, the first data packet sent by the access network device.

Optionally, the receiving unit 910 is further configured to receive a third data packet of the terminal device, where the third data packet includes downlink data of the terminal device and a destination address of the third data packet.

Optionally, the processing unit 920 is further configured to obtain the context information of the terminal device based on the destination address of the third data packet.

Optionally, the processing unit 920 is further configured to process the uplink data based on the context information of the terminal device.

The context information of the terminal device includes the security context information of the terminal device and/or the compression context information of the terminal device.

Optionally, the processing unit is specifically configured to encrypt the downlink data based on the security context information of the terminal device, and/or the core network user plane device compresses the downlink data based on the compression context information of the terminal device.

Optionally, the receiving unit 910 is further configured to receive a fourth data packet sent by the access network device, where the fourth data packet includes the processed downlink data.

Optionally, the fourth data packet includes at least one of the following information: cell information of the terminal device, the identification information of the terminal device or a C-RNTI of the terminal device, a TA list of the terminal device, and an interval between a current moment and a moment of the last data transmission of the terminal device.

Figure 10:
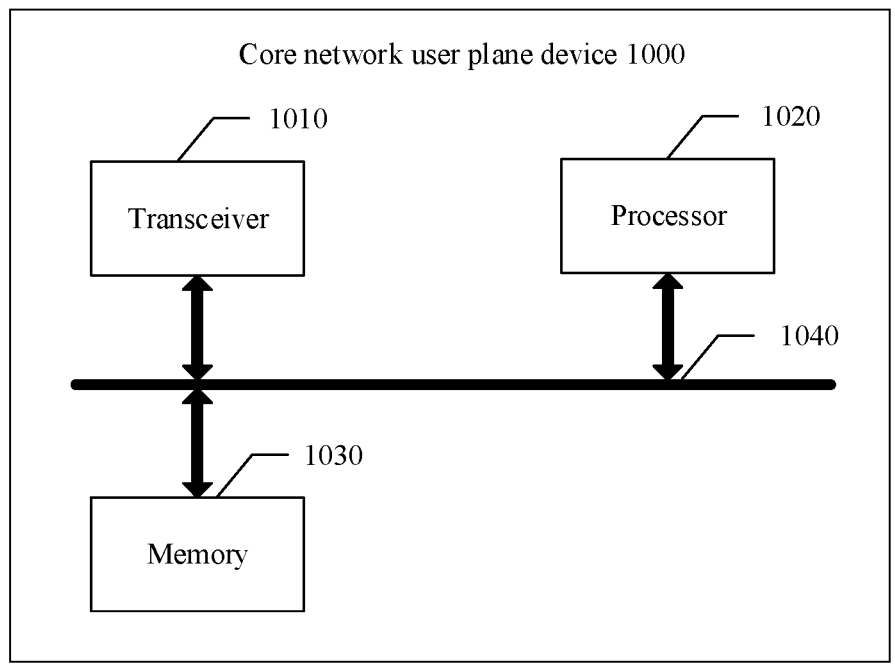
FIG. 10 is a schematic structural diagram of a core network user plane device according to an embodiment of this application.

FIG. 10 shows a communications apparatus 1000 according to an embodiment of this application. The communications apparatus 1000 is configured to implement functions of the core network user plane device in the foregoing methods. The communications apparatus may be a chip system. In this embodiment of this application, the chip system may include a chip, or may include a chip and another discrete component. The communications apparatus 1000 includes a processor 1020, configured to implement the functions of the core network user plane device in the methods provided in the embodiments of this application.

The communications apparatus 1000 may further include a memory 1030, configured to store program instructions and/or data. The memory 1030 is coupled to the processor 1020. The processor 1020 may cooperate with the memory 1030. The processor 1020 may execute the program instructions stored in the memory 1030.

The communications apparatus 1000 may further include a transceiver 1010 (which may be replaced with a receiver and a transmitter, and the receiver implements a receiving function), configured to communicate with another device through a transmission medium, so that an apparatus in the communications apparatus 1000 may communicate with the another device. The processor 1020 sends and receives signaling by using the transceiver 1010, and is configured to implement the method performed by the core network user plane device in the method embodiments of this application.

In this embodiment of this application, a specific connection medium among the transceiver 1010, the processor 1020, and the memory 1030 is not limited. In this embodiment of this application, the memory 1030, the processor 1020, and the transceiver 1010 are connected by using a bus 1040 in FIG. 10. The bus is represented by using a thick line in FIG. 10. A manner of connection between other components is merely an example for description, and is not limited thereto. The bus may be classified into an address bus, a data bus, a control bus, and the like. For ease of representation, only one thick line is used to represent the bus in FIG. 10, but this does not mean that there is only one bus or only one type of bus.

Figure 11:
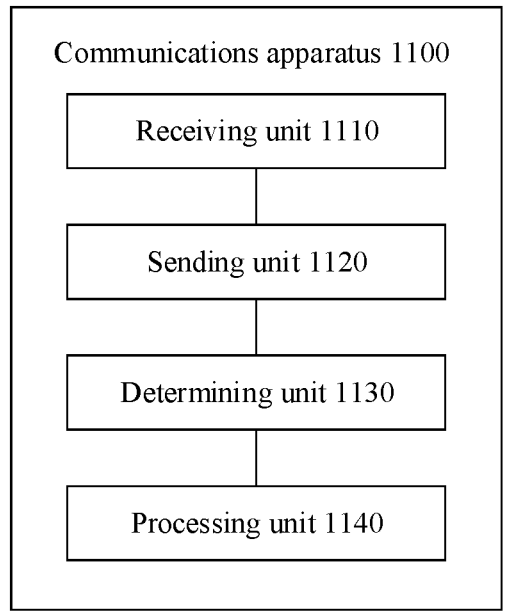
FIG. 11 is a schematic structural diagram of a communications apparatus according to another embodiment of this application.

FIG. 11 is a schematic block diagram of a communications apparatus 1100 according to another embodiment of this application. It should be understood that the communications apparatus 1100 shown in FIG. 11 is merely an example. The communications apparatus 1100 in this embodiment of this application may further include other modules or units, may include modules having functions similar to those of modules in FIG. 11, or may not necessarily include all modules in FIG. 11. As shown in FIG. 11, the communications apparatus 1100 includes a receiving unit 1110, a sending unit 1120, a determining unit 1130, and a processing unit 1140.

In some possible implementations, the communications apparatus 1100 may be the access network device corresponding to the method 300.

The receiving unit 1110 is configured to receive an uplink data packet sent by a terminal device, where the uplink data packet includes uplink data of the terminal device and identification information of the terminal device.

The sending unit 1120 is configured to send a first data packet to a core network user plane device, where the first data packet includes the uplink data of the terminal device and the identification information of the terminal device.

Optionally, the sending unit is specifically configured to send the first data packet to the core network user plane device on a first data tunnel, where the first data tunnel is a data tunnel in at least one common data tunnel, and the at least one common data tunnel is located between the core network user plane device and the access network device.

Optionally, the sending unit 1120 is further configured to send first control information to the terminal device, where the first control information includes the identification information of the terminal device.

The first control information further includes an RRC configuration index of the terminal device and/or identification information of the first data tunnel corresponding to the terminal device.

Optionally, the uplink data packet further includes the RRC configuration index and/or the identification information of the first data tunnel.

Optionally, the communications apparatus 1100 further includes the determining unit 1130, configured to determine an RRC configuration of the terminal based on the RRC configuration index.

Optionally, the communications apparatus 1100 further includes the processing unit 1140, configured to process the uplink data packet based on the RRC configuration to generate the first data packet.

Optionally, the sending unit 1120 is further configured to send the first data packet to the core network user plane device on the first data tunnel selected based on the identification information of the first data tunnel.

Optionally, the first control information further includes information about a valid area of the terminal device.

Optionally, the receiving unit 1110 is further configured to receive second control information sent by a core network control plane device, where the second control information includes the identification information of the first data tunnel that is in the at least one common data tunnel and that corresponds to the terminal device.

Optionally, the receiving unit 1110 is further configured to receive a fourth data packet sent by the core network user plane device, where the fourth data packet includes downlink data of the terminal device that is processed by the core network user plane device.

Optionally, the sending unit 1120 is further configured to send, to the terminal device, the downlink data of the terminal device that is processed by the core network user plane device.

Optionally, the sending unit 1120 is specifically configured to: when a C-RNTI of the terminal device is valid, send, to the terminal device by using the C-RNTI, the downlink data of the terminal device that is processed by the core network user plane device and that is included in the fourth data packet; or when a C-RNTI of the terminal device is invalid, send, to the terminal device through paging, the downlink data of the terminal device that is processed by the core network user plane device and that is included in the fourth data packet.

In some possible implementations, the communications apparatus 1100 may be the access network device corresponding to the method 600.

The receiving unit 1110 is configured to receive a first data packet sent by a terminal device, where the first data packet includes uplink data of the terminal device and identification information of the terminal device.

The processing unit 1140 is configured to obtain context information of the terminal device based on the identification information of the terminal device.

The processing unit 1140 is further configured to process the uplink data based on the context information of the terminal device.

Optionally, the receiving unit 1110 is further configured to receive the context information of the terminal device from a core network control plane device.

Optionally, the context information of the terminal device includes security context information of the terminal device and/or compression context information of the terminal device.

Optionally, the processing unit 1140 is specifically configured to decrypt the uplink data based on the security context information of the terminal device, or decompress the uplink data based on the compression context information of the terminal device.

Optionally, the sending unit 1120 is further configured to send first control information to the terminal device, where the first control information includes the identification information of the terminal device.

Optionally, the first control information further includes a radio resource control RRC configuration index of the terminal device and/or identification information of a first data tunnel corresponding to the terminal device, where the first data tunnel is a data tunnel in at least one common data tunnel.

Optionally, the at least one common data tunnel is located between a core network user plane device and the access network device.

Optionally, the first control information further includes information about a valid area of the terminal device.

Optionally, the receiving unit 1110 is further configured to receive second control information sent by the core network control plane device, where the second control information includes the identification information of the first data tunnel that is in the at least one common data tunnel and that corresponds to the terminal device.

Optionally, the sending unit 1120 is further configured to send a second data packet to the core network user plane device, where the second data packet includes the processed uplink data.

Optionally, the sending unit 1120 is specifically configured to send the second data packet to the core network user plane device on the first data tunnel corresponding to the terminal device.

Optionally, the determining unit 1130 is specifically configured to determine the first data tunnel based on the tunnel identification information.

Optionally, the determining unit 1130 is further configured to determine, based on the RRC configuration index, RRC configuration information used by the terminal device.

Optionally, the processing unit 1140 is further configured to process the uplink data based on the RRC configuration information.

Optionally, the RRC configuration information includes one or more logical channels, and packet data convergence protocol (packet data convergence protocol, PDCP) and/or radio link control (radio link control, RLC) configuration information corresponding to each logical channel. A logical channel and PDCP and/or RLC configuration information that correspond to the RRC configuration index may be sent to the terminal device together with the configuration index, or may be a configuration defined in a protocol. This is not limited in this application. For example, Table 1 lists RRC configuration information corresponding to one RRC configuration index.

Optionally, the receiving unit 1110 is further configured to receive a third data packet of the terminal device that is sent by the core network user plane device, where the third data packet includes downlink data of the terminal device and the identification information of the terminal device.

Optionally, the processing unit 1140 is further configured to determine the identification information of the terminal device based on a destination address of the third data packet.

Optionally, the processing unit 1140 is further configured to obtain the context information of the terminal device based on the identification information of the terminal device.

Optionally, the processing unit 1140 is further configured to process the downlink data based on the context information of the terminal device.

Optionally, the context information of the terminal device includes the security context information of the terminal device and/or compression context information of the terminal device.

Optionally, the processing unit 1140 is specifically configured to encrypt the downlink data based on the security context information of the terminal device, and/or the access network device compresses the downlink data based on the compression context information of the terminal device.

Optionally, the sending unit 1120 is further configured to send a fourth data packet to the terminal device, where the fourth data packet includes the processed downlink data.

Optionally, the sending unit 1120 is specifically configured to: when a C-RNTI of the terminal device is valid, send the fourth data packet to the terminal device by using the C-RNTI; or when a C-RNTI of the terminal device is invalid, send the fourth data packet to the terminal device through paging.

In some possible implementations, the communications apparatus 1100 may alternatively be the access network device corresponding to the method 800.

The receiving unit 1110 is configured to receive an uplink data packet sent by a terminal device, where the uplink data packet includes uplink data of the terminal device and identification information of the terminal device.

The sending unit 1120 is configured to send a first data packet to a network device, where the first data packet includes the uplink data of the terminal device and the identification information of the terminal device.

Optionally, the sending unit 1120 is specifically configured to send the first data packet to the network device on a first partial data tunnel of a first data tunnel, where the first data tunnel is a data tunnel in at least one common data tunnel, each data tunnel in the at least one common data tunnel includes the first partial data tunnel and a second partial data tunnel, the first partial data tunnel is a data tunnel between the access network device and the network device, and the second partial data tunnel is a tunnel between the network device and a core network user plane device.

Optionally, the sending unit 1120 is further configured to send first control information to the terminal device, where the first control information includes the identification information of the terminal device.

Optionally, the first control information further includes an RRC configuration index of the terminal device and/or identification information of the first data tunnel corresponding to the terminal device, and the first data packet further includes the RRC configuration index and/or the identification information of the first data tunnel.

Optionally, the uplink data packet further includes the RRC configuration index and/or the identification information of the first data tunnel.

Optionally, the determining unit 1130 is configured to determine an RRC configuration of the terminal device based on the RRC configuration index.

Optionally, the processing unit 1140 is configured to process the uplink data packet based on the RRC configuration to generate the first data packet.

For example, if RLC configuration information is summarized and included in the RRC configuration information, the processing unit 1140 is configured to remove an RLC header of the uplink data packet, use RLC payload information as the first data packet, and perform an RLC-related status report operation. Alternatively, for example, if RLC configuration information and PDCP configuration information are summarized and included in the RRC configuration information, the processing unit 1140 is configured to remove RLC and PDCP headers of the uplink data packet, and use PDCP payload information as the first data packet.

Optionally, the sending unit 1120 is further configured to send the first data packet to the core network user plane device on the first data tunnel selected based on the identification information of the first data tunnel.

Optionally, the first control information further includes information about a valid area of the terminal device.

Optionally, the receiving unit 1110 is further configured to receive second control information sent by a core network control plane device, where the second control information includes the identification information of the first data tunnel that is in the at least one common data tunnel and that corresponds to the terminal device.

Optionally, the receiving unit 1110 is further configured to receive a fourth data packet sent by the network device, where the fourth data packet includes downlink data of the terminal device that is processed by the network device.

Optionally, the fourth data packet further includes at least one of the following information: cell information of the terminal device, the identification information of the terminal device or a C-RNTI of the terminal device, a TA list of the terminal device, and an interval between a current moment and a moment of the last data transmission of the terminal device.

Optionally, the sending unit 1120 is specifically configured to: when the C-RNTI of the terminal device is valid, send, to the terminal device by using the C-RNTI, the downlink data of the terminal device that is processed by the network device and that is included in the fourth data packet; or when the C-RNTI of the terminal device is invalid, send, to the terminal device through paging, the downlink data of the terminal device that is processed by the network device and that is included in the fourth data packet.

Figure 12:
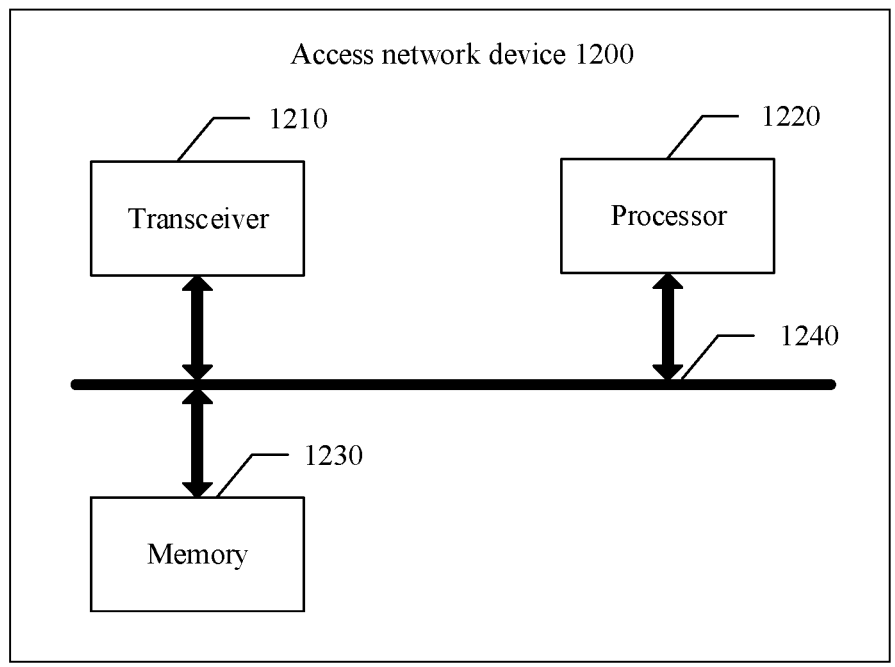
FIG. 12 is a schematic structural diagram of an access network device according to another embodiment of this application.

FIG. 12 shows a communications apparatus 1200 according to another embodiment of this application. The communications apparatus 1200 is configured to implement functions of the access network device in the foregoing methods. The communications apparatus may be a chip system. In this embodiment of this application, the chip system may include a chip, or may include a chip and another discrete component. The communications apparatus 1200 includes a processor 1220, configured to implement the functions of the access network device in the methods provided in the embodiments of this application.

The communications apparatus 1200 may further include a memory 1230, configured to store program instructions and/or data. The memory 1230 is coupled to the processor 1220. The processor 1220 may cooperate with the memory 1230. The processor 1220 may execute the program instructions stored in the memory 1230.

The communications apparatus 1200 may further include a transceiver 1210 (which may be replaced with a receiver and a transmitter, and the receiver implements a receiving function), configured to communicate with another device through a transmission medium, so that an apparatus in the communications apparatus 1200 may communicate with the another device. The processor 1220 sends and receives signaling by using the transceiver 1210, and is configured to implement the method performed by the access network device in the method embodiments of this application.

In this embodiment of this application, a specific connection medium among the transceiver 1210, the processor 1220, and the memory 1230 is not limited. In this embodiment of this application, the memory 1230, the processor 1220, and the transceiver 1210 are connected by using a bus 1240 in FIG. 12. The bus is represented by using a thick line in FIG. 12. A manner of connection between other components is merely an example for description, and is not limited thereto. The bus may be classified into an address bus, a data bus, a control bus, and the like. For ease of representation, only one thick line is used to represent the bus in FIG. 12, but this does not mean that there is only one bus or only one type of bus.

Figure 13:
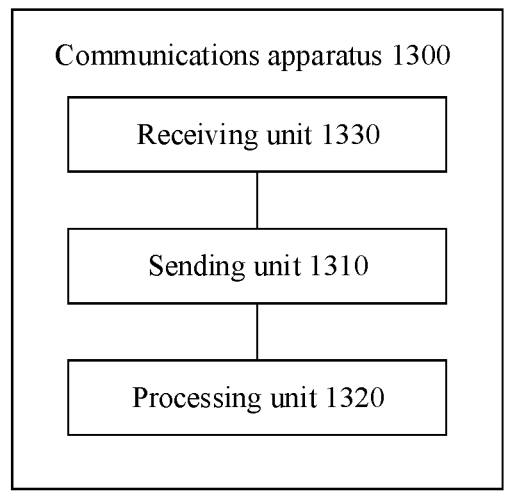
FIG. 13 is a schematic structural diagram of a communications apparatus according to still another embodiment of this application.

FIG. 13 is a schematic diagram of a communications apparatus 1300 according to still another embodiment of this application. It should be understood that the communications apparatus 1300 shown in FIG. 13 is merely an example. The communications apparatus 1300 in this embodiment of this application may further include other modules or units, may include modules having functions similar to those of modules in FIG. 13, or may not necessarily include all modules in FIG. 13. As shown in FIG. 13, the communications apparatus 1300 includes a sending unit 1310 and a processing unit 1320.

In some possible implementations, the communications apparatus 1300 may be the terminal device corresponding to the method 600.

The processing module 1320 is configured to obtain identification information of the terminal device.

The sending unit 1310 is configured to send a first data packet to an access network device, where the first data packet includes uplink data of the terminal device and the identification information of the terminal device.

Optionally, the communications apparatus 1300 further includes a receiving unit 1330, configured to receive first control information sent by the access network device, where the first control information includes the identification information of the terminal device.

Optionally, the first control information further includes an RRC configuration index of the terminal device and/or identification information of a first data tunnel corresponding to the terminal device, where the first data tunnel is a data tunnel in at least one common data tunnel.

Optionally, the first data packet includes the RRC configuration index of the terminal device and/or the identification information of the first data tunnel corresponding to the terminal device.

Optionally, the at least one common data tunnel is located between a core network user plane device and the access network device.

Optionally, the first control information further includes information about a valid area of the terminal device.

Optionally, the processing unit 1320 is further configured to determine, based on the information about the valid area, whether the first data packet is capable of being sent.

Figure 14:
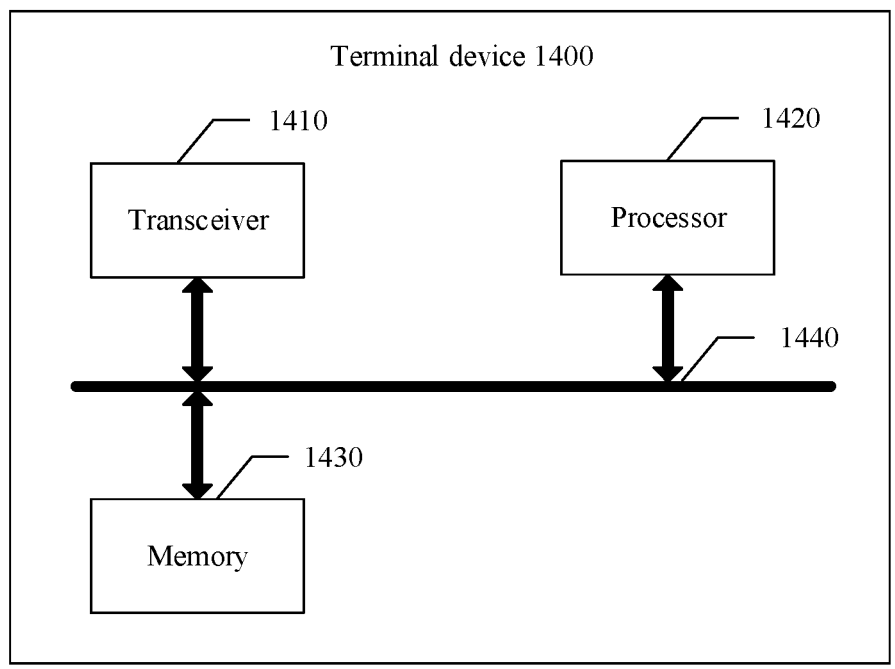
FIG. 14 is a schematic structural diagram of a terminal device according to still another embodiment of this application.

FIG. 14 shows a communications apparatus 1400 according to still another embodiment of this application. The communications apparatus 1400 is configured to implement functions of the terminal device in the foregoing methods. The communications apparatus may be a chip system. In this embodiment of this application, the chip system may include a chip, or may include a chip and another discrete component. The communications apparatus 1400 includes a processor 1420, configured to implement the functions of the terminal device in the methods provided in the embodiments of this application.

The communications apparatus 1400 may further include a memory 1430, configured to store program instructions and/or data. The memory 1430 is coupled to the processor 1420. The processor 1420 may cooperate with the memory 1430. The processor 1420 may execute the program instructions stored in the memory 1430.

The communications apparatus 1400 may further include a transceiver 1410 (which may be replaced with a receiver and a transmitter, and the receiver implements a receiving function), configured to communicate with another device through a transmission medium, so that an apparatus in the communications apparatus 1400 may communicate with the another device. The processor 1420 sends and receives signaling by using the transceiver 1410, and is configured to implement the method performed by the terminal device in the method embodiments of this application.

In this embodiment of this application, a specific connection medium among the transceiver 1410, the processor 1420, and the memory 1430 is not limited. In this embodiment of this application, the memory 1430, the processor 1420, and the transceiver 1410 are connected by using a bus 1440 in FIG. 14. The bus is represented by using a thick line in FIG. 14. A manner of connection between other components is merely an example for description, and is not limited thereto. The bus may be classified into an address bus, a data bus, a control bus, and the like. For ease of representation, only one thick line is used to represent the bus in FIG. 14, but this does not mean that there is only one bus or only one type of bus.

Figure 15:
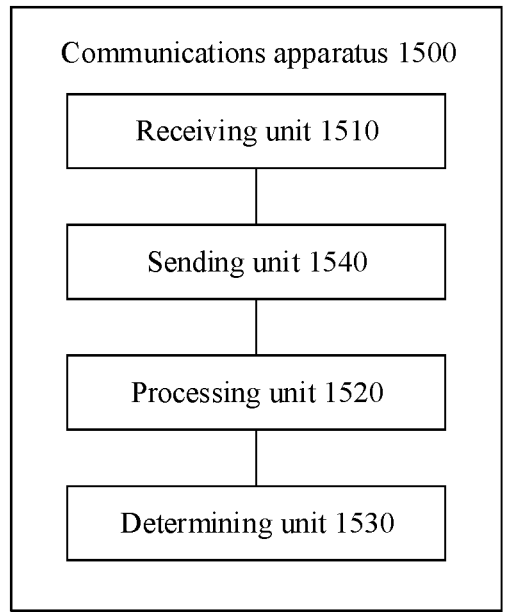
FIG. 15 is a schematic structural diagram of a communications apparatus according to yet another embodiment of this application.

FIG. 15 is a schematic diagram of a communications apparatus 1500 according to yet another embodiment of this application. It should be understood that the communications apparatus 1500 shown in FIG. 15 is merely an example. The communications apparatus 1500 in this embodiment of this application may further include other modules or units, may include modules having functions similar to those of modules in FIG. 15, or may not necessarily include all modules in FIG. 15. As shown in FIG. 15, the communications apparatus 1500 includes a receiving unit 1510 and a processing unit 1520.

In some possible implementations, the communications apparatus 1500 may be the network device corresponding to the method 800.

The receiving unit 1510 is configured to receive a first data packet sent by an access network device, where the first data packet includes uplink data of a terminal device and identification information of the terminal device.

The processing unit 1520 is configured to obtain context information of the terminal device based on the identification information of the terminal device.

The processing unit 1520 is further configured to process the uplink data based on the context information of the terminal device.

Optionally, the receiving unit 1510 is further configured to receive the context information of the terminal device that is sent by a core network control plane device.

Optionally, the context information of the terminal device includes security context information of the terminal device and/or compression context information of the terminal device.

Optionally, the processing unit 1520 is specifically configured to decrypt the uplink data based on the security context information of the terminal device, and/or the network device decompresses the uplink data based on the compression context information of the terminal device.

Optionally, the communications apparatus 1500 further includes a determining unit 1530, configured to determine a first data tunnel corresponding to the terminal device, where the first data tunnel is a tunnel in at least one common data tunnel, each data tunnel in the at least one common data tunnel includes a first partial data tunnel and a second partial data tunnel, the first partial data tunnel is a data tunnel between the access network device and the network device, and the second partial data tunnel is a tunnel between the network device and a core network user plane device.

Optionally, the communications apparatus 1500 further includes a sending unit 1540, configured to send identification information of the first data tunnel to the core network control plane device.

Optionally, the sending unit 1540 is specifically configured to receive, on the first partial data tunnel of the first data tunnel, the first data packet sent by the access network device.

Optionally, the sending unit 1540 is further configured to send a second data packet to the core network user plane device, where the second data packet includes the processed uplink data.

Optionally, the sending unit 1540 is specifically configured to send the second data packet to the core network user plane device on the second partial data tunnel of the first data tunnel corresponding to the terminal device.

Optionally, the receiving unit 1510 is further configured to receive a third data packet of the terminal device that is sent by the core network user plane device, where the third data packet includes downlink data of the terminal device and the identification information of the terminal device.

Optionally, the processing unit 1520 is further configured to obtain the context information of the terminal device based on the identification information of the terminal device.

Optionally, the processing unit 1520 is further configured to process the downlink data based on the context information of the terminal device.

Optionally, the processing unit 1520 is specifically configured to encrypt the downlink data based on the security context information of the terminal device, and/or compress the downlink data based on the compression context information of the terminal device.

Optionally, the sending unit 1540 is further configured to send a fourth data packet of the terminal device to the access network device, where the fourth data packet includes the processed downlink data.

Optionally, the fourth data packet includes at least one of the following information: cell information of the terminal device, the identification information of the terminal device or a C-RNTI of the terminal device, a TA list of the terminal device, and an interval between a current moment and a moment of the last data transmission of the terminal device.

Figure 16:
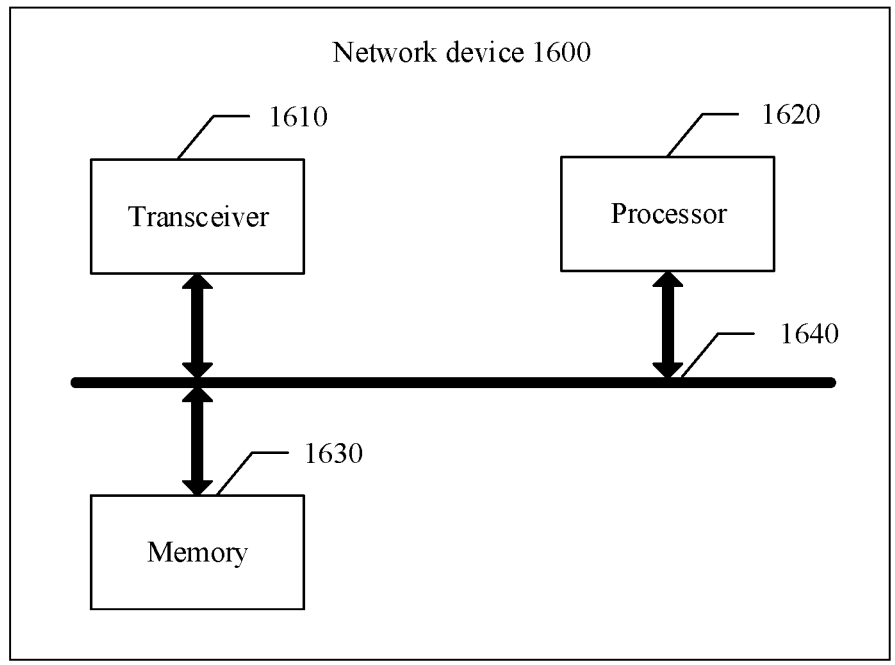
FIG. 16 is a schematic structural diagram of a network device according to yet another embodiment of this application.

FIG. 16 shows a communications apparatus 1600 according to yet another embodiment of this application. The communications apparatus 1600 is configured to implement functions of the network device in the foregoing methods. The communications apparatus may be a chip system. In this embodiment of this application, the chip system may include a chip, or may include a chip and another discrete component. The communications apparatus 1600 includes a processor 1620, configured to implement the functions of the network device in the methods provided in the embodiments of this application.

The communications apparatus 1600 may further include a memory 1630, configured to store program instructions and/or data. The memory 1630 is coupled to the processor 1620. The processor 1620 may cooperate with the memory 1630. The processor 1620 may execute the program instructions stored in the memory 1630.

The communications apparatus 1600 may further include a transceiver 1610 (which may be replaced with a receiver and a transmitter, and the receiver implements a receiving function), configured to communicate with another device through a transmission medium, so that an apparatus in the communications apparatus 1600 may communicate with the another device. The processor 1620 sends and receives signaling by using the transceiver 1610, and is configured to implement the method performed by the network device in the method embodiments of this application.

In this embodiment of this application, a specific connection medium among the transceiver 1610, the processor 1620, and the memory 1630 is not limited. In this embodiment of this application, the memory 1630, the processor 1620, and the transceiver 1610 are connected by using a bus 1640 in FIG. 16. The bus is represented by using a thick line in FIG. 16. A manner of connection between other components is merely an example for description, and is not limited thereto. The bus may be classified into an address bus, a data bus, a control bus, and the like. For ease of representation, only one thick line is used to represent the bus in FIG. 16, but this does not mean that there is only one bus or only one type of bus.

An embodiment of this application further provides a communications system, including one or more of the foregoing communications apparatuses.

This application further provides a computer-readable storage medium. The computer-readable storage medium stores instructions. When the instructions are run on a computer, the computer is enabled to perform the steps performed by the core network user plane device in the methods shown in FIG. 2 to FIG. 8A and FIG. 8B.

This application further provides a computer-readable storage medium. The computer-readable storage medium stores instructions. When the instructions are run on a computer, the computer is enabled to perform the steps performed by the access network device in the methods shown in FIG. 2 to FIG. 8A and FIG. 8B.

This application further provides a computer-readable storage medium. The computer-readable storage medium stores instructions. When the instructions are run on a computer, the computer is enabled to perform the steps performed by the terminal device in the methods shown in FIG. 2 to FIG. 8A and FIG. 8B.

This application further provides a computer-readable storage medium. The computer-readable storage medium stores instructions. When the instructions are run on a computer, the computer is enabled to perform the steps performed by the network device in the methods shown in FIG. 2 to FIG. 8A and FIG. 8B.

This application further provides a computer program product including instructions. When the computer program product is run on a computer, the computer is enabled to perform the steps performed by the core network user plane device in the methods shown in FIG. 2 to FIG. 8A and FIG. 8B.

This application further provides a computer program product including instructions. When the computer program product is run on a computer, the computer is enabled to perform the steps performed by the access network device in the methods shown in FIG. 2 to FIG. 8A and FIG. 8B.

This application further provides a computer program product including instructions. When the computer program product is run on a computer, the computer is enabled to perform the steps performed by the terminal device in the methods shown in FIG. 2 to FIG. 8A and FIG. 8B.

This application further provides a computer program product including instructions. When the computer program product is run on a computer, the computer is enabled to perform the steps performed by the network device in the methods shown in FIG. 2 to FIG. 8A and FIG. 8B.

This application further provides a chip, including a processor. The processor is configured to read and run a computer program stored in a memory, to perform a corresponding operation and/or procedure performed by the core network user plane device in the data transmission methods provided in this application. Optionally, the chip further includes the memory. The memory is connected to the processor through a circuit or a cable. The processor is configured to read and execute the computer program in the memory. Further, optionally, the chip further includes a communications interface. The processor is connected to the communications interface. The communications interface is configured to receive data and/or information that need/needs to be processed. The processor obtains the data and/or the information from the communications interface, and processes the data and/or the information. The communications interface may be an input/output interface.

This application further provides a chip, including a processor. The processor is configured to invoke and run a computer program stored in a memory, to perform a corresponding operation and/or procedure performed by the access network device in the data transmission methods provided in this application. Optionally, the chip further includes the memory. The memory is connected to the processor through a circuit or a cable. The processor is configured to read and execute the computer program in the memory. Further, optionally, the chip further includes a communications interface. The processor is connected to the communications interface. The communications interface is configured to receive data and/or information that need/needs to be processed. The processor obtains the data and/or the information from the communications interface, and processes the data and/or the information. The communications interface may be an input/output interface.

This application further provides a chip, including a processor. The processor is configured to invoke and run a computer program stored in a memory, to perform a corresponding operation and/or procedure performed by the terminal device in the data transmission methods provided in this application. Optionally, the chip further includes the memory. The memory is connected to the processor through a circuit or a cable. The processor is configured to read and execute the computer program in the memory. Further, optionally, the chip further includes a communications interface. The processor is connected to the communications interface. The communications interface is configured to receive data and/or information that need/needs to be processed. The processor obtains the data and/or the information from the communications interface, and processes the data and/or the information. The communications interface may be an input/output interface.

This application further provides a chip, including a processor. The processor is configured to invoke and run a computer program stored in a memory, to perform a corresponding operation and/or procedure performed by the network device in the data transmission methods provided in this application. Optionally, the chip further includes the memory. The memory is connected to the processor through a circuit or a cable. The processor is configured to read and execute the computer program in the memory. Further, optionally, the chip further includes a communications interface. The processor is connected to the communications interface. The communications interface is configured to receive data and/or information that need/needs to be processed. The processor obtains the data and/or the information from the communications interface, and processes the data and/or the information. The communications interface may be an input/output interface.

In the foregoing embodiments, the processor may be a central processing unit (central processing unit, CPU), a microprocessor, an application-specific integrated circuit (application-specific integrated circuit, ASIC), one or more integrated circuits for controlling program execution in the technical solutions of this application, or the like. For example, the processor may be a digital signal processor device, a microprocessor device, an analog-to-digital converter, and a digital-to-analog converter. The processor may allocate control and signal processing functions of a terminal device or a network device to these devices based on respective functions of these devices. In addition, the processor may have a function of operating one or more software programs. The software programs may be stored in the memory. The function of the processor may be implemented by hardware, or may be implemented by hardware executing corresponding software. The hardware or software includes one or more modules corresponding to the function.

The memory may be a read-only memory (read-only memory, ROM) or another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in an instruction or data structure form and that can be accessed by a computer.

Optionally, the memory and the memory in the foregoing embodiments may be physically independent units, or the memory may be integrated into the processor.

In the embodiments of this application, "at least one" means one or more, and "a plurality of" means two or more than two. The term "and/or" describes an association relationship between associated objects and represents that three relationships may exist. For example, A and/or B may represent: Only A exists, both A and B exist, and only B exists. A and B may be singular or plural. The character "/" generally indicates an "or" relationship between the associated objects. The term "at least one of the following items" or a similar expression thereof indicates any combination of the items, including a single item or any combination of a plurality of items. For example, at least one of a, b, and c may represent: a, b, c, a and b, a and c, b and c, or a, b, and c, where a, b, and c may be singular or plural.

A person of ordinary skill in the art may be aware that units and algorithm steps described in the embodiments disclosed in this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus and method may be implemented in other manners. For example, the described apparatus embodiments are merely examples. For example, division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may not be physically separate, and parts displayed as units may not be physical units, and may be located in one position, or may be distributed on a plurality of network units. Some or all of the units may be selected based on an actual requirement to achieve the objectives of the technical solutions of this application.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A data transmission method, comprising:
    sending, by an access network device, first control information to a terminal device, wherein the first control information comprises identification information of the terminal device, wherein the identification information comprises a temporary mobile subscriber identity (TMSI), wherein the first control information further comprises a radio resource control (RRC) configuration index of the terminal device, the RRC configuration index corresponding to a set of RRC configuration information, wherein the set of RRC configuration information includes a logical channel identifier (ID), logical channel priority information, and at least one of a packet data convergence protocol (PDCP) parameter or a radio link control (RLC) parameter;
    receiving, by the access network device, an uplink data packet sent by the terminal device, wherein the uplink data packet comprises uplink data of the terminal device and the identification information of the terminal device; and
    sending, by the access network device, a first data packet to a core network user plane device, wherein the first data packet comprises the uplink data of the terminal device and the identification information of the terminal device.

2. The method according to claim 1, wherein the sending, by the access network device, the first data packet to the core network user plane device comprises:
    sending, by the access network device, the first data packet to the core network user plane device on a first data tunnel, wherein the first data tunnel is a data tunnel in at least one common data tunnel, and the at least one common data tunnel is located between the core network user plane device and the access network device.

3. The method according to claim 1, wherein the first control information further comprises identification information of a first data tunnel corresponding to the terminal device.

4. A data transmission method, comprising:
    receiving, by a terminal device, first control information sent by an access network device, wherein the first control information comprises identification information of the terminal device, wherein the identification information comprises a temporary mobile subscriber identity (TMSI), wherein the first control information further comprises a radio resource control (RRC) configuration index of the terminal device, the RRC configuration index corresponding to a set of RRC configuration information, wherein the set of RRC configuration information includes a logical channel identifier (ID), logical channel priority information, and at least one of a packet data convergence protocol (PDCP) parameter or a radio link control (RLC) parameter; and
    sending, by the terminal device, a first data packet to an access network device, wherein the first data packet comprises uplink data of the terminal device and the identification information of the terminal device.

5. The method according to claim 4, wherein the first control information further comprises identification information of a first data tunnel corresponding to the terminal device, and the first data tunnel is a data tunnel in at least one common data tunnel.

6. A communication apparatus comprising at least one processor, and one or more memories coupled to the at least one processor and storing programming instructions for execution by the at least one processor to cause the apparatus to:
    send, first control information to a terminal device, wherein the first control information comprises identification information of the terminal device, wherein the identification information comprises a temporary mobile subscriber identity (TMSI), wherein the first control information further comprises a radio resource control (RRC) configuration index of the terminal device, the RRC configuration index corresponding to a set of RRC configuration information, wherein the set of RRC configuration information includes a logical channel identifier (ID), logical channel priority information, and at least one of a packet data convergence protocol (PDCP) parameter or a radio link control (RLC) parameter;

receive an uplink data packet from the terminal device, wherein the uplink data packet comprises uplink data of the terminal device and the identification information of the terminal device; and send a first data packet to a core network user plane device, wherein the first data packet comprises the uplink data of the terminal device and the identification information of the terminal device.

7. The apparatus according to claim 6, wherein the first control information further comprises identification information of a first data tunnel corresponding to the terminal device.

8. The apparatus according to claim 6, wherein the programming instructions, when executed by the at least one processor, cause the apparatus to send the first data packet to the core network user plane device on a first data tunnel, wherein the first data tunnel is a data tunnel in at least one common data tunnel, and the at least one common data tunnel is located between the core network user plane device and an access network device.

9. A terminal device, comprising:
at least one processor;
and one or more memories coupled to the at least one processor and storing programming instructions for execution by the at least one processor to cause the terminal device to perform operations comprising:
receiving first control information sent by an access network device, wherein the first control information comprises identification information of the terminal device, wherein the identification information comprises a temporary mobile subscriber identity (TMSI), wherein the first control information further comprises a radio resource control (RRC) configuration index of the terminal device, the RRC configuration index corresponding to a set of RRC configuration information, wherein the set of RRC configuration information includes a logical channel identifier (ID), logical channel priority information, and at least one of a packet data convergence protocol (PDCP) parameter or a radio link control (RLC) parameter; and sending a first data packet to an access network device, wherein the first data packet comprises uplink data of the terminal device and the identification information of the terminal device.

10. The terminal device according to claim 9, wherein the first control information further comprises identification information of a first data tunnel corresponding to the terminal device, and the first data tunnel is a data tunnel in at least one common data tunnel.

11. One or more non-transitory computer-readable media storing computer instructions, that when executed by one or more processors, cause a computing device to perform operations comprising:
receiving first control information sent by an access network device, wherein the first control information comprises identification information of a terminal device, wherein the identification information comprises a temporary mobile subscriber identity (TMSI), wherein the first control information further comprises a radio resource control (RRC) configuration index of the terminal device, the RRC configuration index corresponding to a set of RRC configuration information, wherein the set of RRC configuration information includes a logical channel identifier (ID), logical channel priority information, and at least one of a packet data convergence protocol (PDCP) parameter or a radio link control (RLC) parameter; and sending a first data packet to an access network device, wherein the first data packet comprises uplink data of the terminal device and the identification information of the terminal device.

12. The one or more non-transitory computer-readable media according to claim 11, wherein the first control information further comprises identification information of a first data tunnel corresponding to the terminal device, and the first data tunnel is a data tunnel in at least one common data tunnel.

* * * * *